United States Patent [19]

Gradek

[11] Patent Number: 5,688,075
[45] Date of Patent: Nov. 18, 1997

[54] BOOM SYSTEM

[76] Inventor: Thomas Gradek, 63 des Bocages, Chomedey, Laval Quebec, H7W 4Z1, Canada

[21] Appl. No.: 534,686

[22] Filed: Sep. 27, 1995

Related U.S. Application Data

[63] Continuation-in-part of Ser. No. 140,921, Oct. 25, 1993, abandoned.

[51] Int. Cl.$^6$ .................................................. E02B 15/06
[52] U.S. Cl. ........................ 405/63; 405/60; 210/923; 210/242.3
[58] Field of Search ........................ 405/63–72, 60; 210/242.2, 242.3, 923

[56] References Cited

U.S. PATENT DOCUMENTS

| | | | |
|---|---|---|---|
| 3,565,257 | 2/1971 | Cavalieri | 210/242.2 |
| 3,648,463 | 3/1972 | Ayers | 405/72 |
| 3,998,060 | 12/1976 | Preus | 405/72 X |
| 4,781,493 | 11/1988 | Fischer | 405/63 |
| 5,165,821 | 11/1992 | Fischer et al. | 405/63 |
| 5,374,133 | 12/1994 | Lazes et al. | 405/63 X |

*Primary Examiner*—Dennis L. Taylor
*Attorney, Agent, or Firm*—Ronald S. Kosie; Robert Brouillette

[57] ABSTRACT

An improved boom for use in containing oil spills and the like on water comprises a flotation tube, an upper chain pocket, a skirt, and a lower chain pocket. The skirt may be made to sink by placing a chain in the lower chain pocket. The spill is contained, and buoyancy provided for the boom, by filling the flotation tube with a particulate liquid sorbent. The tube is fabricated of a mesh material pervious to both the oil and water. The skirt may be fabricated of a material pervious to water, and if so desired, to oil.

41 Claims, 11 Drawing Sheets

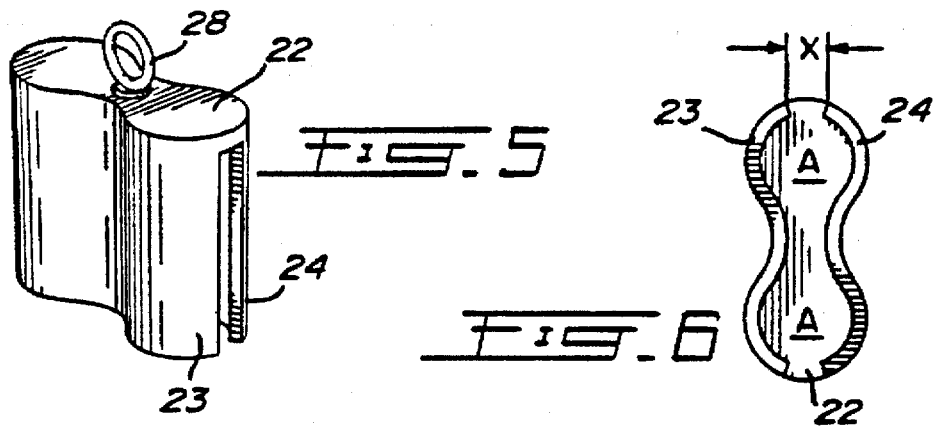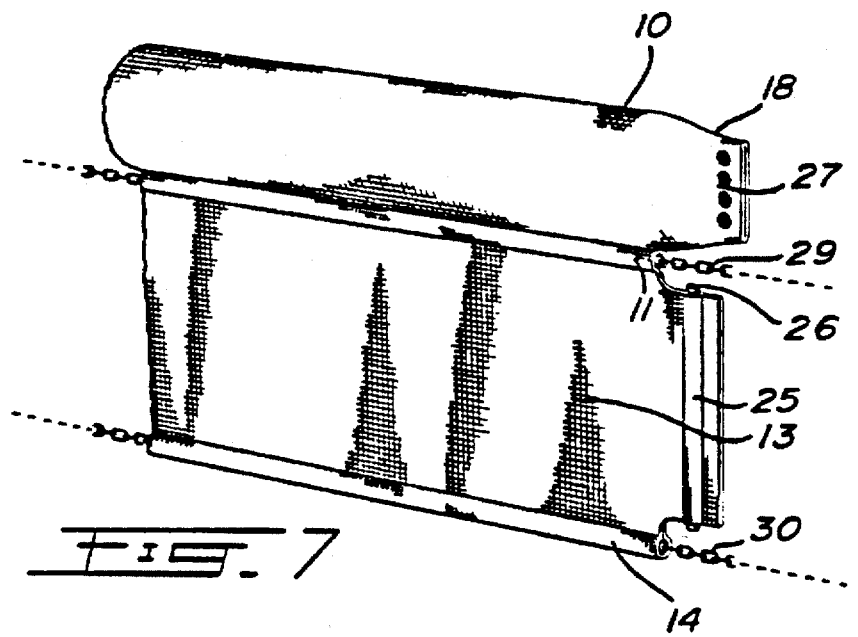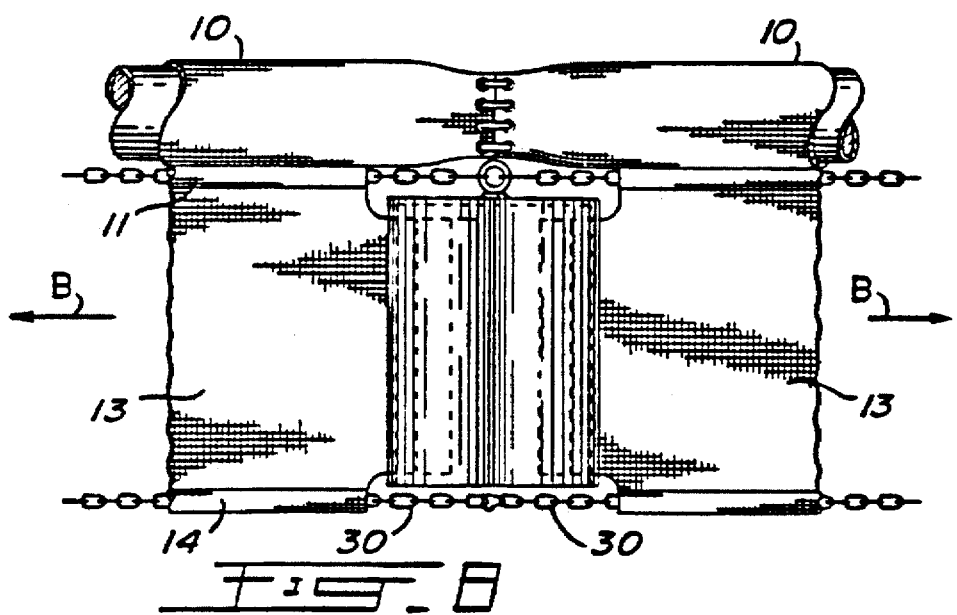

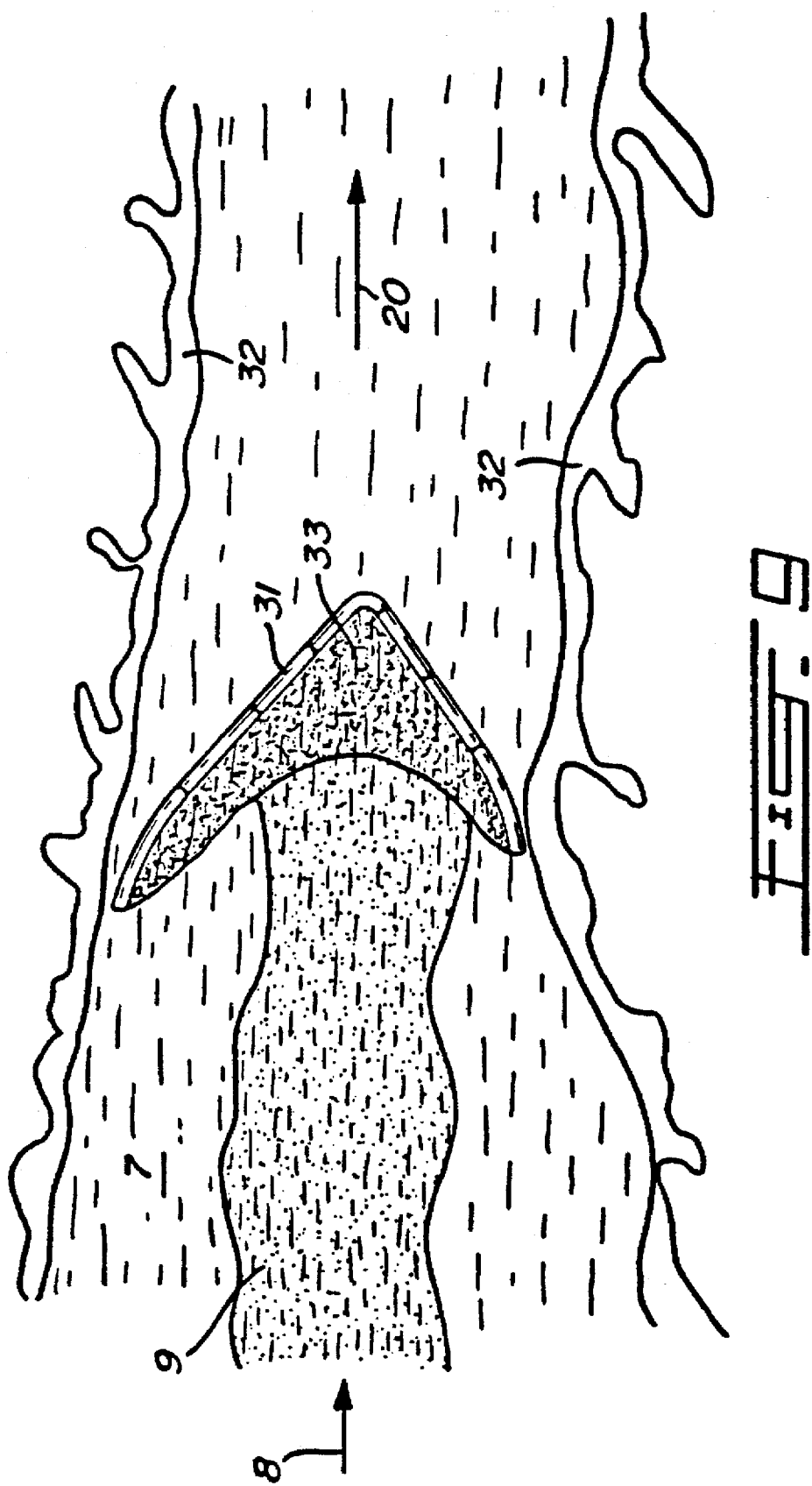

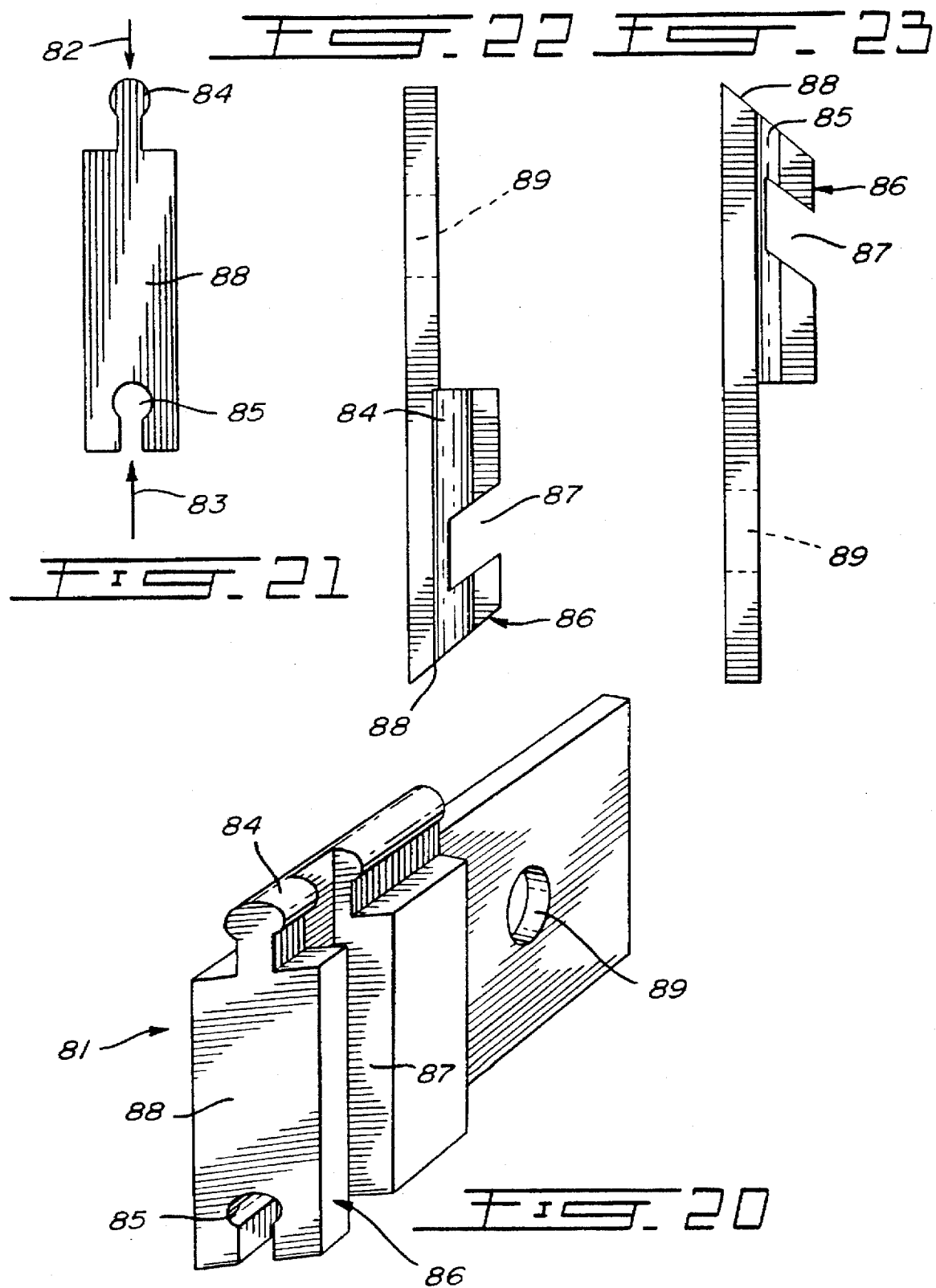

BOOM SYSTEM

The present is a continuation-in-part of U.S. patent application Ser. No. 08/140,921 filed on Oct. 25, 1993 now abn.

This invention relates to spill booms, of the type used to contain, and, optionally, to recover, a lighter liquid disposed on top of a heavier liquid, i.e. the lighter liquid floats on top of the heavier liquid. The words light or lighter and heavy or heavier as used herein in relation to liquids are to be understood as referring to the specific gravity of the liquids, i.e. a lighter liquid has a lower specific gravity than a heavier liquid such that the lighter liquid floats on the heavier liquid. The lighter liquid may be immiscible or essentially immiscible with the heavier liquid and may, for example, exist as a relatively thin layer upon the heavier liquid. The invention is in particular, directed to the containment of oil or other liquid hydrocarbons which are disposed on a body of water.

Booms of the above type are used to contain and recover an immiscible light liquid existing as a relatively thin film on water. Thus such a boom may, for example, be used in dealing with oil, and other liquid chemical, spills on both fresh and sea water.

An (oil) spill containment boom is essentially a floating mechanical barrier. Known generic boom components include an upper freeboard portion to inhibit oil from passing thereover, a submerged portion to inhibit oil from passing therethrough, a lower skirt portion defining a wall for the purpose of inhibiting the passage of underneath the boom and a strength or reinforcement means to resist loads imposed by wind, waves, currents and the like as well as by towing in open water. Such containment booms also have a buoyancy system and a ballast system. The buoyancy system comprises flotation means which may, if desired, also define at least a part of the freeboard of the containment boom; the ballast system may have a dual function in that it may act to reinforce the boom as well as acting as ballast (e.g. it may be a length of heavy chain).

A freeboard element or portion of a boom is defined by the height or portion of the boom which is normally intended during use to be above the adjacent liquid line. In the case of a containment boom floating on water and being used to contain a hydrocarbon like material such as crude petroleum the liquid line on one side will, for example, be the line defined by the upper surface of the light liquid (e.g. crude oil) floating on the body of water adjacent the boom and on the other side will be defined by the upper surface of the body of water adjacent the boom; the freeboard will communally be above both these liquid lines. The freeboard portion thus may act as an upper wall part so as to wall or block off or fence in the lighter liquid. While the freeboard provides an outer upper exterior surface for defining a mechanical barrier to the lighter liquid, a submerged portion of the boom system provides a lower continuation of such barrier to again block off the lighter liquid.

Thus a containment boom may comprise flotation containment means, skirt containment means, reinforcing means, and ballast or sinker means; the flotation containment means may comprise buoyancy means and a freeboard element; the buoyancy means is a portion of the boom that acts to buoy the system in the heavier liquid. The skirt may be weighted by the ballast such that when the boom is in place in a body of water, the containment skirt depends or is suspended from the flotation containment means (e.g. from the buoyancy means) downwardly into the water. Lateral forces—which can be quite substantial, are accommodated by the reinforcement. Generally, both the ballast and the reinforcement are chains of suitable strength and weight. The flotation means and the skirt means of such known boom systems are known to be constructed from a suitable material(s) which is (are) reasonably flexible, but which is (are) impervious to the liquid being contained or recovered.

Booms of this general type are effective, and are often used in dealing with oil spills. These booms are most effective when used in still water—which in fact is a very rare occurrence. However, they are not completely effective in containing a spill on water which is moving, either continuously, such as in a river or in a seaway, or discontinuously, such as in tidal water. In such situations the overall water flow past the boom poses a problem. The known boom systems are essentially impervious and serve to obstruct the water flow. Consequently water can be forced to flow under the boom containment skirt, and carry entrained light liquid with it. When such a boom is used in moving water, for example to contain a liquid spill from a surface sewer or drain into a river, its effectiveness may leave something to be desired.

It is known to deploy a sorbent boom alongside a primary containment boom, e.g. outside primary containment boom. The purpose of the sorbent boom is to capture or sorb any light liquid which may come into contact therewith; such known sorbent booms are different from typical containment booms in that they do not have a separate flotation element or skirt. Sorbent booms may be cylinders of rolled sorbent pads encased in a nylon netting (a "sausage" boom) or cylinders of sorbent granules in a finer mesh netting (a "popcorn" boom); in use a plurality of such cylinders are linked end to end. With respect to the recovery of oil, the sorbent may be of a (polymeric) material(s) which on the one hand is highly oleophilic and on the other highly hydrophobic; in other words the (crude) oil or petroleum will have a greater tendency to stick to the sorbent than water.

It would be advantageous to have a boom system around which water can flow with but little hindrance, and which yet contains a lighter liquid, such as, for example, spilled crude oil, gasoline, diesel oil, home heating oil, or other liquid hydrocarbons, etc.

It would also be advantageous to have a boom system which can sorb a lighter liquid floating on top of a heavier liquid so as to facilitate skimming of the lighter liquid from the upper surface of the heavier liquid.

SUMMARY OF INVENTION

The present invention generally relates to a boom system of the type including a skirt and ballast, for containing a lighter liquid disposed on top of a heavier liquid. The system includes flotation containment means for containing the lighter liquid. The system exploits a skirt means which is pervious at least to the heavier liquid and comprises an open mesh wall having mesh openings for the passage of the heavier liquid through the skirt means. The flotation containment means comprises sorption means for sorbing the lighter liquid,
and buoyancy means for the flotation of the sorption means. The sorption means may comprise a wall component configured to containing a sorbent for sorbing lighter liquid, i.e. the wall component acts as an envelope means for holding the sorbent. The wall component may comprise a mesh wall element pervious to at least the lighter liquid.

In accordance with the present invention a wall component for holding sorbent may comprise a mesh wall element which is pervious to both the lighter liquid and the heavier liquid. In this case the boom system may be used to facilitate or enhance the skimming of the light liquid from the top surface of the heavier liquid as the heavier liquid passes by the boom system.

In a particular aspect the present invention thus provides in a boom system for containing a lighter liquid disposed on top of a heavier liquid, said system comprising flotation containment means for containing lighter liquid disposed on top of heavier liquid, skirt means, ballast means, and reinforcing means, said flotation containment means comprising buoyancy means for the flotation of the boom system, said flotation containment means, when the boom system is in use, being able to define an exterior surface comprising a freeboard exterior surface and a submerged exterior surface, said flotation containment means comprising sorption means for sorbing lighter liquid, said buoyancy means being able to buoy said sorption means, said sorption means comprising a porous medium for sorbing the lighter liquid and a wall component configured to contain said porous medium, at least part of said wall component comprising a mesh material pervious to both the lighter and the heavier liquid such that lighter liquid may pass through the mesh material of the wall component for contacting said porous medium, said skirt means having an upper edge and a lower edge, said upper edge being attached to the flotation containment means such that when the boom system is in use the skirt means depends from the flotation containment means, said ballast means beings disposed along said lower edge of said skirt means, the improvement wherein said skirt means is pervious at least to the heavier liquid and comprises an open mesh wall having mesh openings for the passage of the heavier liquid through the skirt means, and wherein the reinforcing means is disposed along said upper edge of the skirt means.

In accordance with the present invention the expression "freeboard exterior surface" refers to the exterior surface of a freeboard element of the boom whereas the expression "submerged exterior surface" refers to the exterior surface of an element of the boom which is below the liquid line, i.e. a surface which may be considered to be in contact with liquid.

In accordance with the present invention, each of the expressions "porous medium", "porous media", and the like are to be understood as referring to a medium or media comprising a collection of fragments, particles, granules, beads, strips and the like arranged such that a liquid is able to flow through interstices formed therebetween or therein. Additionally, the characterization of the expressions "porous medium" and the like as being "for sorbing lighter liquid" is to be understood as meaning that the sorption capacity of the "porous medium" and the like may be due to the fact that the individual constituent fragments, particles and the like are able to individually sorb lighter liquid per se;

that the individual constituents of the medium are so physically arranged that while not able to individually sorb light liquid, their physical arrangement confers a sorption capacity to the medium (e.g. an arrangement favouring capillary action); or a combination of the above.

In accordance with another particular aspect the present invention provides in a boom system for containing a lighter liquid disposed on top of a heavier liquid said system comprising flotation containment means for containing the lighter liquid disposed on top of the heavier liquid, skirt means, ballast means, and reinforcing means, said flotation containment means comprising buoyancy means for the flotation of the boom system, said buoyancy means, when the boom system is in use, having an exterior surface comprising a freeboard exterior surface and a submerged exterior surface, said buoyancy means comprising a buoyancy component comprising a porous medium for sorbing the lighter liquid and for providing buoyancy for the flotation of the boom system and a wall component for containing said porous medium, at least part of said wall component comprising a mesh material pervious to both the lighter and the heavier liquid such that lighter liquid may pass through the wall component for contacting said porous medium, said skirt means having an upper edge and a lower edge, said upper edge being attached to the flotation containment means such that when the boom system is in use the skirt means depends from the flotation containment means, said ballast means beings disposed along said lower edge of said skirt means, the improvement wherein said skirt means is pervious at least to the heavier liquid and comprises an open mesh wall having mesh openings for the passage of the heavier liquid through the skirt means, and wherein the reinforcing means is disposed along said upper edge of the skirt means.

In accordance with an additional aspect the present invention provides in a boom system for containing a lighter liquid disposed on top of a heavier liquid, said system comprising flotation containment means for containing lighter liquid disposed on top of heavier liquid, skirt means, ballast means, and reinforcing means, said flotation containment means comprising buoyancy means for the flotation of the boom system, said flotation containment means, when the boom system is in use, being able to define an exterior surface comprising a freeboard exterior surface and a submerged exterior surface, said skirt means having an upper edge and a lower edge, said upper edge being attached to the flotation containment means such that when the boom system is in use the skirt means depends from the flotation containment means, said ballast means being disposed along said lower edge of said skirt means, the improvement wherein the flotation containment means comprises detachable cover sorption means for sorbing lighter liquid, said detachable cover sorption means covering at least a part of an exterior surface of said buoyancy means, said detachable cover sorption means being disposed such that when the boom system is in use the detachable cover sorption means is able to define at least part of said freeboard exterior surface and at least part of said submerged exterior surface, wherein said detachable cover sorption means comprises a porous medium for sorbing the lighter liquid and a wall component for containing said porous medium, wherein at least part of said wall component comprises a mesh material pervious to both the lighter and the heavier liquid such that lighter liquid may pass through the mesh material of the wall component for contacting said porous medium, wherein said skirt means is pervious at least to the heavier liquid and comprises an open mesh wall having mesh openings for the passage of the heavier liquid through the skirt means, and wherein the reinforcing means is disposed along said upper edge of the skirt means.

In accordance with a further aspect the present invention provides in a boom system for containing a lighter liquid disposed on top of a heavier liquid, said system comprising flotation containment means for containing lighter liquid disposed on top of heavier liquid, skirt means, ballast means, and reinforcing means, said flotation containment means comprising buoyancy means for the flotation of the boom system, said flotation containment means, when the boom system is in use, being able to define an exterior surface comprising a freeboard exterior surface and a submerged exterior surface, said skirt means having an upper edge and a lower edge, said upper edge being attached to the flotation containment means such that when the boom system is in use the skirt means depends from the flotation containment means, said ballast means being disposed along said lower edge of said skirt means, the improvement wherein the flotation containment means comprises detachable cover sorption means for sorbing lighter liquid, said cover sorption means covering at least a part of an exterior surface of said buoyancy means, said detachable cover sorption means being releasably attached to said buoyancy means by releasable attachment means such that when the boom system is in use the detachable cover sorption means is able to define at least part of said freeboard exterior surface and at least part of said submerged exterior surface, wherein said cover sorption means comprises a first porous medium for sorbing lighter liquid and a cover wall component for containing said first porous medium, wherein at least part of said cover wall component comprises a mesh material pervious to both the lighter and the heavier liquid such that lighter liquid may pass through the mesh material of the wall component for contacting said first porous medium, wherein said buoyancy means comprises a buoyancy component, said buoyancy component comprising a second porous medium for sorbing said lighter liquid and for providing buoyancy for the flotation of the boom system and a second wall component configured to contain said second porous medium, wherein at least part of said second wall component comprises a mesh material pervious to both the lighter and the heavier liquid such that lighter liquid may pass through the mesh material of the second wall component for contacting said second porous medium, wherein said skirt means is pervious at least to the heavier liquid and comprises an open mesh wall having mesh openings for the passage of the heavier liquid through the mesh wall, and wherein the reinforcing means is disposed along said upper edge of the skirt means.

A cover sorption means may, if desired, be merely lain down over a buoyancy means or it may be attached to a buoyancy means. Preferably, the cover sorption means is removably attached to a buoyancy means by releasable attachment means, such as a plurality of eyelet/clip connecters, magnetic connectors, hook/mat connectors such as Velcro, etc..

In accordance with the present invention, the mesh material of a wall component of a sorption means may define at least part of the submerged exterior surface of the flotation containment means or the buoyancy means thereof, as the case may be. Thus, for example, in the case of the mesh material of a wall component of a buoyancy component, the mesh material thereof may define at least part of the submerged exterior surface of the buoyancy means. Similarly, in the case of the mesh material of a cover wall component of a cover sorption means (referred to below), the mesh material thereof may define at least part of the submerged exterior surface of the flotation containment means. On the other hand, the mesh material of a wall component may define at least part of the freeboard exterior surface as well as at least part of the submerged exterior surface of a flotation containment means or of a constituent buoyancy means.

In accordance with the present invention, a buoyancy means may solely comprise a wall component holding a suitable sorbent medium, e.g. the flotation element may consist of an envelope filled with a sorbent medium able to buoy the boom system.

As mentioned above, a wall component for holding a sorbent medium may be only partly, of a mesh material pervious to both the lighter and the heavier liquid, i.e. the envelope means may have a wall portion which is of a material which is impervious to the light and\or heavy liquid. On the other hand, if desired, such a wall component may be wholly (including substantially wholly) of a mesh material pervious to both the lighter and the heavier liquid.

A sorbent medium may be contained in a wall component within a removable inner tube. The inner tube may be removably disposed within the wall component, the inner tube comprising a mesh wall of a mesh material pervious to both the lighter and the heavier liquid. The mesh material of a wall component of a buoyancy component and of an inner tube may consist of the same or different mesh materials. The inner tube may facilitate the replacement of sorbent medium when installing or using the boom system; if the sorbent medium is being replaced during use of a boom system, a sorbent envelope means advantageously may include an air bladder or other flotation means to assist in the flotation of the system during such replacement.

In accordance with the present invention the skirt means may have an upper edge and a lower edge, the upper edge being adjacent to the flotation containment means. The reinforcing means may be disposed adjacent the upper edge of the skirt means in an upper chain pocket. The reinforcing means may comprise a reinforcing member selected from the group comprising a chain and a wire rope. The ballast means may comprise a chain adjacent to the lower edge of the skirt means disposed in a lower chain pocket. The mesh wall of the envelope means, the upper and lower chain pockets, and the mesh wall of the skirt means may if desired be each made of the same or different mesh material, the mesh material being pervious to both the lighter and the heavier liquid.

In accordance with a further aspect the present invention provides a boom assembly for containing a lighter liquid disposed on top of a heavier liquid comprising a plurality of containment sections joined together end to end (in any suitable fashion), each said containment section comprising a boom system as herein described.

A boom system in accordance with the present invention may be used to contain a lighter liquid on top of a heavier liquid with which it is at least substantially immiscible. Thus, a boom system in accordance with the present invention may, in particular, be used for containing oil spills and the like on water.

The boom system of the present invention may advantageously be used on flowing water. The lighter liquid may pass into and be caught up by the boom system as the water passes past the boom system, i.e. the boom system facilitates skimming of the lighter liquid off of the moving water so as to reduce or even eliminate entrained lighter liquid flowing past the boom with the water.

In accordance with the present invention the sorption means and the buoyancy or flotation means may be separate elements such that the sorption means does need to not contribute to the buoyancy of the boom system. For example, the flotation means which keeps the sorption means afloat may comprise any known type of flotation element to which the sorption means may be attached so as to maintain the sorption means on top of the heavier liquid in contact with the lighter liquid. The sorption means may, for example, as mentioned above, be configured in the form of a type of cover which may be draped or wrapped around at least a portion of a flotation element as shall be discussed below.

Alternatively, in accordance with the present invention at least a portion of the buoyancy of the boom system may be provided by a liquid sorbent, i.e. the flotation means and sorption means may be integrated. In this case the sorbent medium may be contained directly within a flotation element. Thus, for example, a flotation element may be filled with a sorbent medium adapted to absorb the lighter liquid, and to provide sufficient flotation for the boom system.

A boom system may in particular comprise a flotation tube, an upper chain pocket, a skirt, and a lower chain pocket. The boom may be strengthened by placing a chain (or wire rope, if a still boom is required, in the upper chain pocket). The skirt may be made to sink by placing a chain in the lower chain pocket. Both the tube, pockets, and skirt may be fabricated from a plastic mesh pervious to both water and the lighter liquid. The lighter liquid may be contained, and buoyancy provided for the boom, by filling the flotation tube with a buoyant sorbent.

The boom system of the present invention may advantageously be used on flowing water, as the water can pass the boom with limited or no entrainment of the lighter liquid.

The elements of the boom system such as the buoyancy member, envelope means, inner tube, etc. may be made of any suitable (known) fabric or mesh material which is pervious to both the lighter and heavier liquids, e.g. woven or non-woven. The mesh material may for example be of woven polyester filaments. A suitable fabric is a woven fabric woven from thermoplastic monofilaments, and which has been heatset to weld the monofilaments to each other at substantially all the crossover points in the weave pattern. The fabric may be made from any suitable thermoplastic monofilaments such as polyesters with, as necessary or if desired, a suitable chemically resistant coating. A suitable fabric is one in which the monofilaments comprise a core of a polyester (e.g. polyethylene terephthalate (PET)) coated with polyvinyl chloride (PVC). On heatsetting, the woven monofilaments become welded to each other thus transforming a woven fabric into what is effectively a sheet of mesh. In such two part monofilaments, the polyester provides the desired strength, and the coating the required chemical stability. A suitable fabric material may be obtained from Phifer Industries Ltd, Tuscalossa, Ala., U.S.A. under the name Phifertex.

The skirt means may likewise be made of any suitable (known) fabric or mesh material which is pervious at least to the heavier liquid, keeping in mind that the skirt comprises an open mesh wall having mesh openings for the passage of the heavier liquid through the skirt means. The mesh material may for example be of a woven fabric. The skirt may if desired be made of a mesh material pervious to both the lighter and heavier liquids such as mentioned above. Preferably, the skirt is of a mesh material which is of an oleophilic material; e.g. when the light liquid comprises a hydrocarbon(s) containing material such as, for example, crude oil or petroleum, bunker "C" oil, heating oil, (light) diesel oil and the like. The oleophilic material may, for example, be polyethylene, polypropylene and the like as well as a polyvinyl chloride material or a reinforcing material coated therewith. A suitable fabric may be obtained under the name Phifertex referred to above. The mesh size of the mesh wall for the skirt may be such as to provide at least about 35% open or void space for any given surface area of skirt wall, e.g. up to 50–60% open or void space. In general since a boom system herein may be used in relation to moving water the apertures of mesh material may be sized so as to minimize the pressure differential between the upstream and downstream side of a boom system with a view to avoid or inhibit vortex type formations in the heavier liquid which may result in entrainment of the lighter liquid under the skirt. The apertures of a mesh material may for example be from about 5 mm$^2$ to about 15 mm$^2$, for example from 6.5 mm$^2$ to 12.75 mm$^2$.

If desired the walls of the other elements of the boom system may likewise be of an oleophilic material.

Conveniently the wall parts of the boom may be constructed of the same fabric. Alternatively, an inner tube may be constructed from a fabric with a different, usually finer, weave pattern than that used for the remainder of the boom.

The fabric weave pattern of a mesh wall for an envelope containing sorbent medium, may for example be such as to provide substantially rectangular (e.g. square) holes in the fabric. A mesh having the configuration of a substantially oblong hole, rather than a substantially square hole, is preferable. Such a latter fabric appears to have two advantages: if the sorbent is in particulate form, the mesh material provides adequate powder retention, and has a less restrictive effect on the water flowing through it. A fabric having a mesh count of about 4.7 monofilaments/cm (12 monofilaments/inch) in one direction, and about 6.7 monofilaments/cm (17 monofilaments/inch) in the other, woven from monofilaments having a diameter of about 0.64 mm (0.025 inch) has been found to be satisfactory. A nonwoven sheet fabric with suitably sized and placed apertures could also be used. If the fabric mesh is too small, no light liquid penetrates into the sorbent medium in the flotation tube, and water flow through the boom is unduly restricted, to the point, in the end, that the advantages of the pervious features of the boom are either impaired or lost altogether. If the fabric mesh used to contain the sorbent medium is too large, sorbent fragments, particles and the like may not be retained in the boom, which in the end can result in the boom having a reduced operating efficiency and even sinking if there is no second buoyancy component. The apertures of the mesh material for the envelope means holding the sorbent medium may take on the same size ranges referred to above for the skirt mesh material keeping in mind, however, that the envelope must retain the sorbent medium fragments, etc..

The sorbent medium may be of any type of material which can sorb or which can be configured to sorb or adsorb the lighter liquid. The sorbent, preferably, is of (polymeric) material(s) which on the one hand is (are) highly oleophilic and on the other highly hydrophobic; in other words (crude) oil or petroleum or the liquid hydrocarbons will have a greater tendency to stick to the sorbent than water. Preferably, the sorbent medium may, in particular, be any (known) (solid) sorbent medium which is readily separable from the sorbed liquid, and is reusable. The sorbent medium may be in any suitable form so long as a porous sorbent medium is provided. A sorbent material may, for example, be obtained in a massive or bulk form and thereafter be reduced to the desired fragmentary form, particulate form, strip form and the like. A bulk foam may, for example, be cut up or chopped up into sheets, rolls, strips, cubes, spheres and the like as desired. Alternatively a sorbent may be produced directly in the desired particulate format.

The sorbent medium may, for example, comprise a plurality of (thin) strips of polyethylene or of polypropylene film disposed (i.e. arrayed) in an inner tube as described above so as to facilitate sorption of light liquid; the strips may have a linguini type shape. The strips may, for example, be made of the same material as is presently used to make garbage bags (e.g. light density polyethylene film) and may even be obtained by cutting or shredding (polyethylene) garbage bags into strips (e.g. Glad Kitchen Catchers).

The sorbent medium may, for example, be derived from a foam material having an open cell structure; the foam material may be flexible or rigid. The sorbent medium may, for example, be derived from a rigid or flexible foam material having an open cell structure (e.g. a polyurethane foam material).

Foam materials which may be used may be purchased in bulk form from Dominion Foam Inc. Montreal Quebec, Canada; buoyant flexible foams include foams sold under the following designations: product 9500 1 lb/ft$^3$. Other foams include those which may be obtained from E. R. Carpenter of Ville D'Anjou, Montreal, Quebec, Canada under the following designations: product H-28 1.8–1.9 lb/ft$^3$, M-2 2.0 lb/ft$^3$, H-38 1.8 lb/ft$^3$, etc.. These foams may, however, take up water as well as oil in significant amounts, i.e. have low hydrophobic properties.

On the other hand, the liquid sorbent may for example be derived from a rigid polyurethane foam material having an open cell structure.

Alternatively, the sorbent may be a sorbent of a cellulosic material such as sorbent described in U.S. Pat. Nos. 4,753, 917 and 4,670,156; the entire contents of these patents are incorporated herein by reference. The cellulosic sorbent may for example be in particulate form.

As mentioned above the sorbent may be buoyant. Thus at least a part or all of the buoyancy of the boom system may be provided by the sorbent. In this case the sorbents referred to above from Dominion Foam Inc. and "Carpenter" or in the U.S. Pat. Nos. 4,753,917 and 4,670,156 may possibly be used for this additional purpose.

On the other hand, if the sorbent medium is not to provide a buoyancy component then known sorbents such as sorbent days may be used keeping in mind that they may have low hydrophobic properties and may thus take up significant amounts of water which may not be desirable; the buoyancy means will of course have to be configured to be able to float the sorbent and any sorbed liquid.

As mentioned above, the (solid) sorbent may be in any form, size or shape. For example, if the lighter liquid is to be separated from the sorbent such that the sorbent may be reused, the separation of the sorbed liquid from the solid sorbent may, for example, be achieved by centrifugation. In this case the sorbent medium should be configured keeping in mind that the sorbent material preferably is one capable of being subjected to a centrifugal treatment so as to separate sorbed liquid therefrom. Thus the sorbent medium may comprise sorbent particles sized so as to facilitate centrifugal treatment; the particles the may for example have a size in the range of 2.5 cm to about 0.5 mm or smaller as long as the sorbent medium is able to be treated by a centrifuge treatment step to remove liquid therefrom.

The main limitation on the use of the boom system as described herein is the properties of the liquid it is desired to recover. Any corrosive liquid which would attack or destroy the mesh and\or the sorbent cannot of course be recovered using the present invention.

BRIEF DESCRIPTION OF DRAWINGS

Example embodiments of the invention will now be described by way of reference to the drawings in which:

FIGS. 5, and 6, show an example connector for the boom system of FIG. 3;

FIG. 7 illustrates an end of the boom system of FIG. 3;

FIG. 8 illustrates two boom systems connected together end to end;

FIG. 9 illustrates a catchment boom in use in a flow situation;

FIG. 16 illustrates an alternate embodiment of a boom system according to the present invention using a cover envelope to encase the sorbent material wherein the ends of the envelope are provided with sleeves containing a bar magnet or the like;

FIG. 20 is a schematic perspective view of a connector element for making a flexible connection between adjacent skirt elements;

FIG. 21 is a front view of the connector element shown in FIG. 20;

FIG. 22 is a top view of the connector element shown in FIG. 20; and

FIG. 23 is a bottom view of the connector element shown in FIG. 20.

These Figures will be described in relation to the containment of a spill of an immiscible liquid, typically crude oil or other liquid hydrocarbon material (the light liquid), on water (the heavier liquid). However, it is to be understood that this invention is not so limited and can be used for the containment and recovery of any light liquid spread or floating on the surface of a heavier one.

Figure 1:
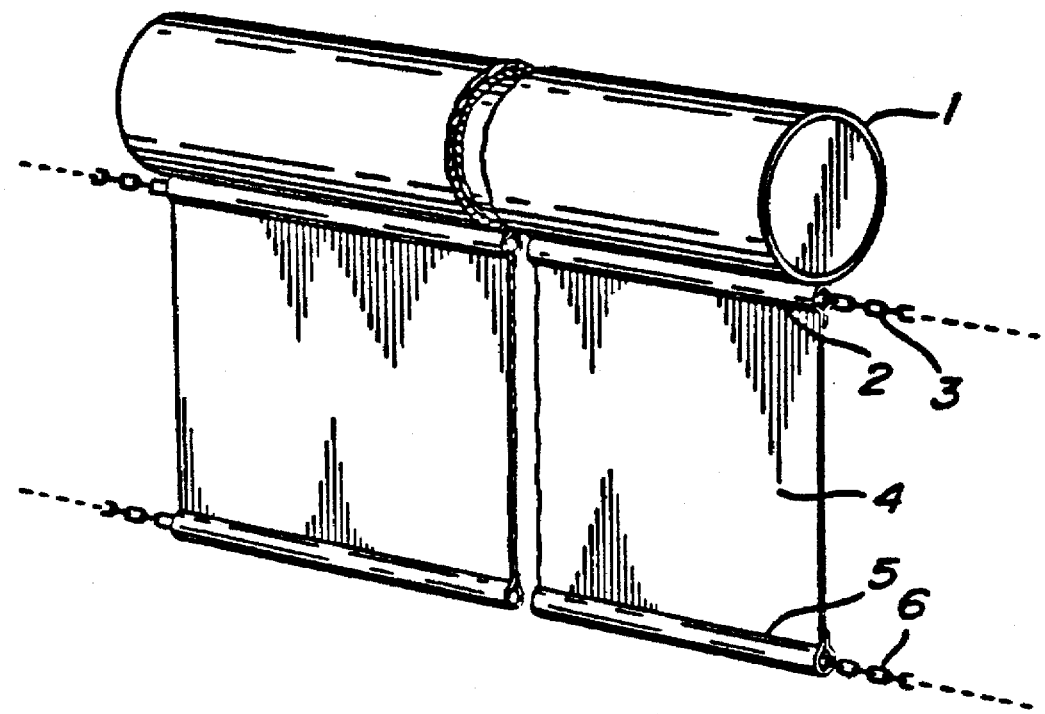
FIG. 1 illustrates a prior art boom system.

FIG. 1 illustrates a known type of boom system. The boom system comprises a flotation tube 1 from which depend downwardly in sequence an upper chain pocket 2 containing a chain 3, a skirt 4, and a lower chain pocket 5 containing a chain 6. The flotation tube, for flotation purposes, may comprise an air bladder or it may be filled with a buoyant material such as foamed polystyrene. The chains 3 and 6 are linked together whenever a plurality of the boom systems are assembled to provide a suitable length for a boom assembly; each section of the boom assembly may generally be about 8 meters (25 feet) long. If a stiff boom is desired, the upper chain can be replaced by a wire rope. The boom is generally constructed of a relatively durable, flexible, and chemically resistant plastic sheet material such as for example of polyvinylchloride (PVC). The flotation tube may generally be about 25 to 40 cm (9 to 16 ins.) in diameter, and the skirt may be about 60 cm (2 feet) deep. The skirt 4 defines a wall which is uninterrupted by any openings, i.e. it is impervious to the oil and water.

Figure 2:
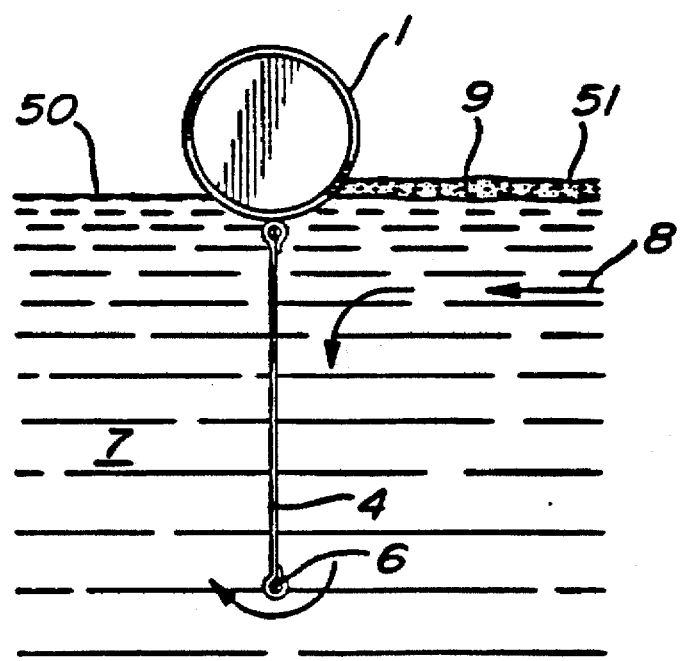
FIG. 2 illustrates a cross section of the boom system of FIG. 1.

A boom system such as illustrated in FIGS. 1 and 2 has a drawback when used in water which is moving. This situation is shown in FIG. 2. Although the boom flotation tube 1 and skirt 4 will serve to contain a lighter liquid 9 (i.e. an oil) on top of the water 7, the movement of the water cannot be stopped. Therefore, as shown by the arrows 8, the water will continue to flow past the boom, which functions, to a degree, as an underflow weir. The result is that as water flows under the lower chain pocket 6 at least some of the oil 9 may be entrained with it. Just how much lighter liquid may be entrained will depend on the nature of the lighter liquid, the water flow rate, water turbulence, etc.. This problem is particularly important when a catchment boom as shown in FIG. 9 is in use.

Figure 3:
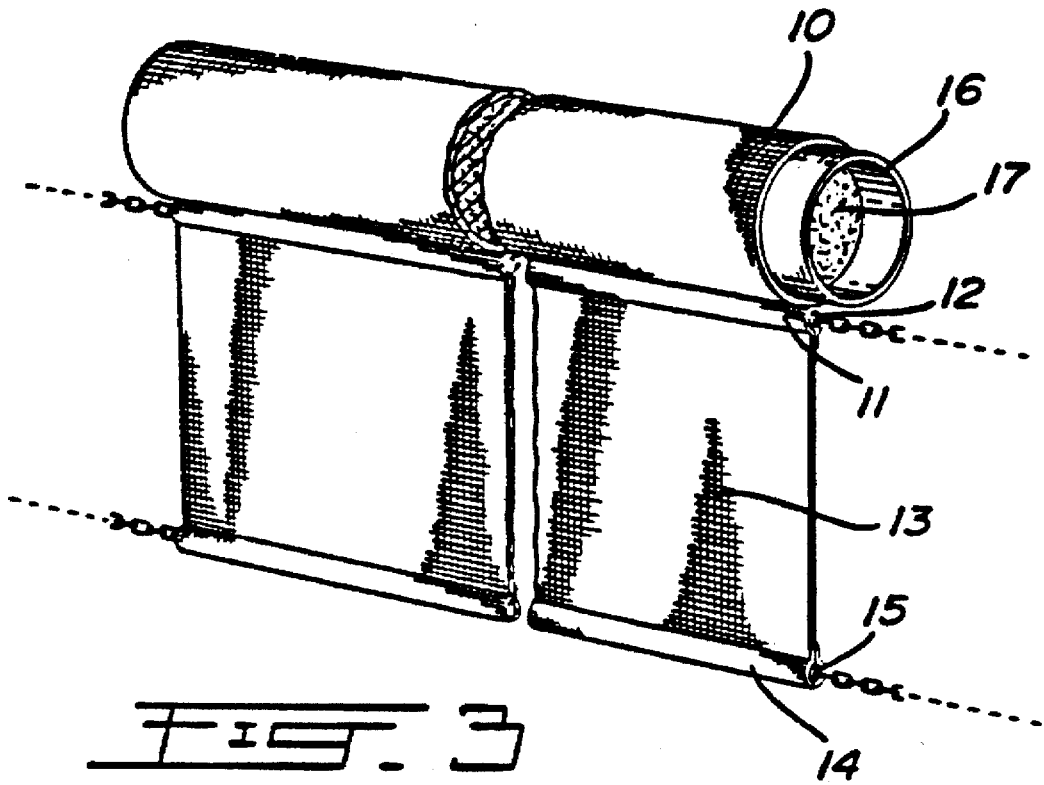
FIG. 3 illustrates an embodiment of a boom system according to the invention.
Figure 4:
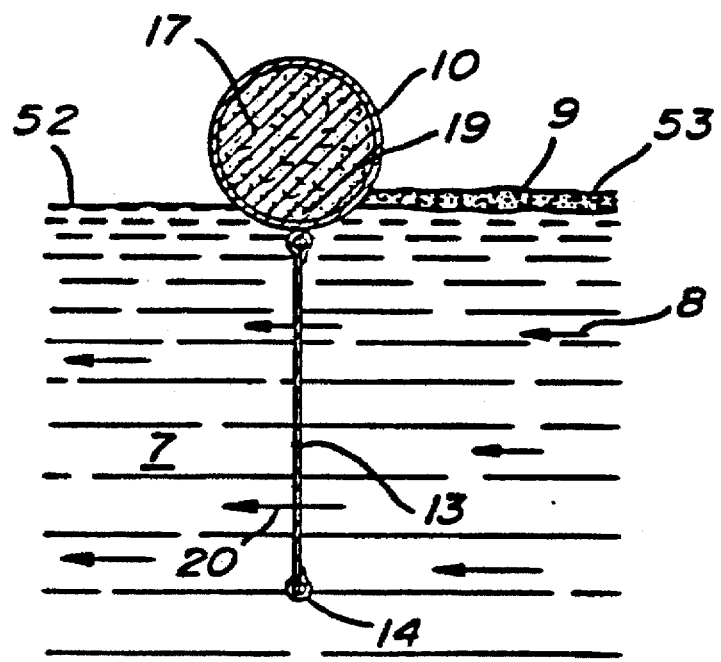
FIG. 4 illustrates a cross section of the boom system of FIG. 3.

FIGS. 3 and 4 illustrate an example boom system in accordance with the present invention. Although the boom system of FIGS. 3 and 4 is visually similar to that of FIGS. 1 and 2 its construction is quite different.

The boom as shown in FIGS. 3 and 4 consists of a top flotation tube 10, from which depend downwardly in sequence an upper chain pocket 11 containing a chain or wire rope 12, a skirt 13, and a lower chain pocket 14 containing a chain 15. The flotation tube 10 defines the wall component of the buoyancy means and as such is intended to contain, hold or envelope a sorbent as discussed below. The skirt, and preferably also the chain pockets are fabricated from any suitable pervious fabric or mesh material, through which at least water will pass, or through which both lighter liquid (i.e. oil) and water will pass. It is convenient to fabricate the flotation tube, chain pockets, and skirt from the same pervious fabric material, i.e. in the case wherein the flotation tube and the skirt are to be of a material pervious to both the lighter and heavier liquid.

On its own the flotation tube 10 will neither float nor retain the light liquid. Both flotation and light liquid retention may be achieved by filling the flotation tube with a suitable quantity of buoyant sorbent material so as to form a porous medium; if a particulate sorbent is to be used the particles thereof must of course be of a suitable size so as to be retained in the tube 10 and not pass through the openings of the mesh material of which the tube 10 is made. As shown in FIG. 4 the liquid sorbent can be packed directly into the tube 10. In practice this is not very convenient, as it makes the boom sections difficult to transport, and to assemble into a long boom assembly. The arrangement shown in FIG. 3 is therefore preferred. As shown the buoyant liquid sorbent is packed into a fabric or mesh inner tube or bladder 16 of any given length, the light liquid being able to pass through the walls into the interior of the inner tube 16 so as to be sorbed by the liquid sorbent. The inner tube 16 may be made of the same material as is used for the rest of the boom. With this construction, it is easy to transport a boom system as essentially three parts (namely, liquid sorbent, the inner tube, and the boom proper) and assemble it on site. The liquid sorbent packed in the bladder 16 may, for example, be particulate in form; however, it may also be in large chunks or blocks, strips, etc. if so desired. As an additional source of buoyancy, a separate air bladder may also, if desired, be arranged in an inner tube; the air bladder may include a polystyrene foam component to again add to the buoyancy of the system.

The boom system of the present invention, as shown in FIG. 4, functions differently to that of FIG. 1. Since the skirt 13 is of a fabric or mesh having mesh openings for the passage of the heavier liquid through the skirt means, the water flow 8 will largely pass straight through it, as at 20, with effectively no entrainment of the light liquid 9 occurring. The light liquid 9 is contained by the buoyant liquid sorbent 17 which is in the flotation tube 10. The light liquid, as shown at 19, will penetrate to some extent into the liquid sorbent. Preferably, the skirt mesh wall is of an oleophilic material such that if there is entrained oil passing with the water, any entrained oil which contacts the material of the mesh will tend to stick to the skirt mesh wall, i.e. the skirt may act as a type of sieve means so as to catch entrained oil. The skirt may also be configured to not only minimise the blockage of water but also to act as a kind of sieve in order to capture particles of the free floating buoyant sorbent (see description below with respect to FIG. 9) which may be entrained with the water and which would otherwise pass past the boom system.

As was noted above for the known booms, a boom assembly of this invention may also be constructed using a plurality of boom sections, each of which reflects a boom system of the present invention. Generally a boom section may be 8 meters (25 feet) or 16 meters (50 feet) in length; other section lengths may of course be used. In order to prevent leakage of light liquid between the boom sections, a joint is desirable which is substantially light liquid tight. FIGS. 5 and 6 illustrate a suitable connector device, for joining boom sections together. The connector shown is used to join together the skirt part of the boom. The connector comprises a top plate 22 and two attached skirt elements 23 and 24 (see FIG. 6, which is a bottom view of FIGS. 5). The two skirt elements 23 and 24 have a curved serpentine shape, as can be seen in the bottom view of FIG. 5 shown in FIG. 6. The connector as shown also carries a ring 28 on the top plate. The gap X between the skirt elements 23 and 24 is chosen so as to allow the adjacent skirt end edges of adjacent skirts 13 to enter the connector, as will be discussed below. The connector may, for example, be made of an aluminium alloy.

In FIG. 7 is shown the end of a boom section, prepared for attachment to the connector of FIG. 5. The end of the flotation tube 10 is flattened to provide a tab end portion 18 which extends a little beyond the chain pocket 11. This tab end may be made by folding a portion of the flotation tube back onto itself. A plurality of holes as at 27 are also provided in the tab end portion 18. Below the flotation tube, the end 29 of the chain, (or wire in a stiff boom), extends from the chain pocket. The end of the skirt 13 extends below the tab end portion 18 and includes a pocket 25 into which is inserted an engagement rib 26. The rib can be anything that is suitably durable and suitably stiff. The pocket is sized to be a relatively close fit to the rib. The rib may, for example, be a solid wooden or metal strip. Preferably, it is a plastics fibre rope; a suitable rib material may be a length of 2.5 cm diameter (flexible) nylon rope.

In FIG. 8 the ends of two adjacent boom sections are shown connected together. To connect two boom section ends the connector is slid downwardly over the adjacent ends of the skirts 13 so that each rib 25 is engaged into the connector, in the spaces A in FIG. 6. The gap X between the edges of the connector skirt elements is sufficiently large so as to allow the ends of the skirts 13 to enter the connector. The gap X, however, is too narrow to allow the respective ribs 25 to pass transversely through it in the direction of a boom section length (i.e. in the direction of the arrow B); the two adjacent skirt ends are thus effectively connected together. The two chain ends 29 extending from the two upper chain pockets are attached to the ring 28 with suitable chain shackles. The two chain ends 30 extending from the lower chain pockets are joined directly together with suitable chain shackles. The two flotation tube tab ends 18 are also pulled together, again with suitable shackles, through the holes 27 tightly, preferably so that there is a small overlap as is shown in FIG. 8. In this way a strong and relatively leak proof joint is made between the boom section ends.

In FIG. 9 a particularly advantageous use of a boom system according to the invention is shown. A moving body of water 7 travelling in the direction 8 is carrying along with it an oil slick 9' between banks 32. A boom 31 is placed across the channel, to catch and to contain for removal the oil slick 9'. If the boom 31 is a conventional prior art boom then it can only be successful if the water flow rate is not so high that significant entrainment of oil can be removed from in front of the boom as fast as it accumulates. Oil removal from in front of the boom can be facilitated by positioning a continuously replenished layer of buoyant particulate sorbent (as described herein), as at 33, adjacent to and in front of the boom. Nevertheless, there is significant risk that some of the oil will be entrained beneath the boom and escape. However, if a boom according to this invention is used, preferably also with the same layer of buoyant sorbent adjacent to and ahead of it, because the water can now flow through the boom, the entrainment risk may be significantly reduced or eliminated.

When a boom assembly according to the present invention is dismantled, any oil sorbed into the liquid sorbent in the flotation tube may be mechanically or chemically recovered e.g. by a pressing step or a simple centrifugation step.

Figure 10:
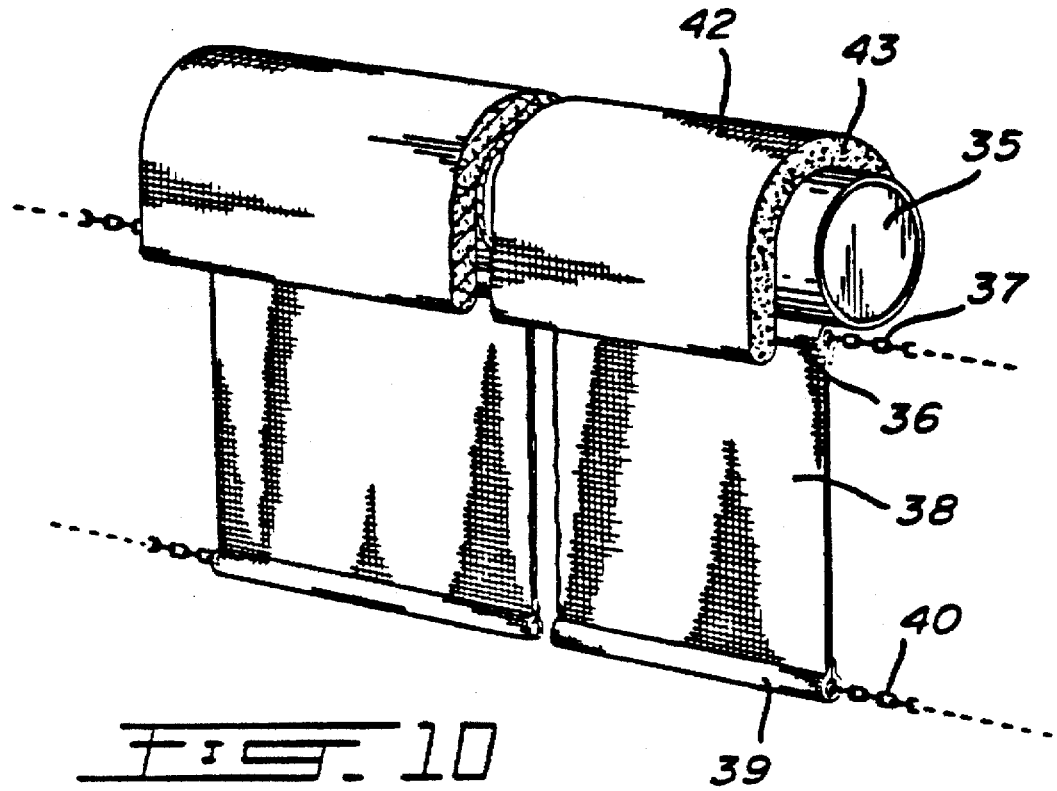
FIG. 10 illustrates an alternate embodiment of a boom system according to the present invention using a cover envelope to encase the sorbent material.
Figure 11:
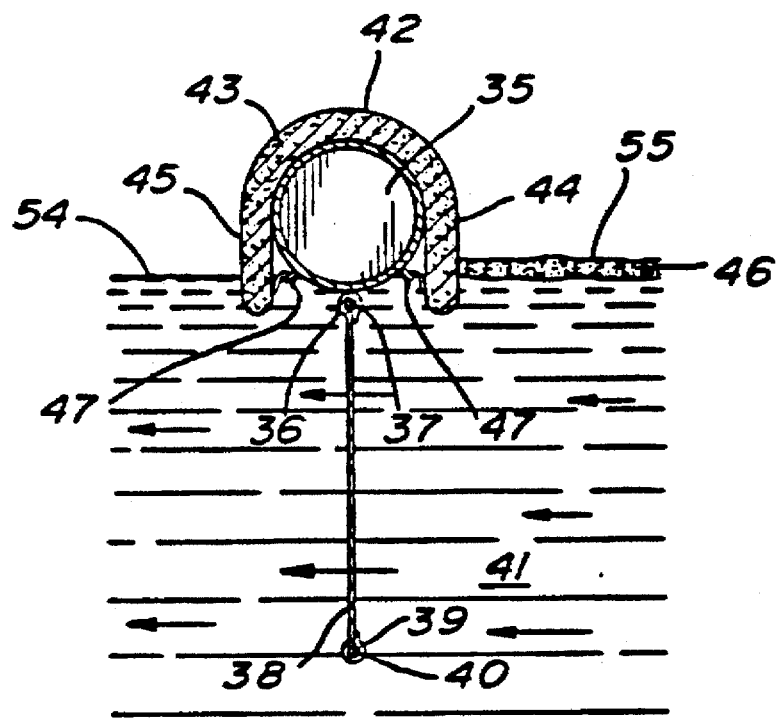
FIG. 11 illustrates a cross section of the boom of FIG. 10.

FIGS. 10 and 11 illustrate an alternate embodiment of a boom system in accordance with the present invention which may, for example, be used to contain a relatively thin layer of lighter liquid such as a layer of gasoline. The illustrated boom system has a flotation tube 35 from which depend downwardly in sequence an upper chain pocket 36 containing a chain 37, a pervious skirt 38, and a lower chain pocket 39 containing a chain 40. The flotation tube 35, for flotation purposes, comprises an air bladder or it may be filled with a buoyant material such as foamed polystyrene. The skirt 38 has the same characteristics as the skirt 13 described with respect to FIGS. 3 and 4; in this respect if a floating layer of buoyant sorbent is disposed upstream of the boom (as discussed above for FIG. 9), the skirt 38 as mentioned above may be configured to not only minimise the blockage of water 41 but also to act as a kind of sieve in order to capture particles of the free floating buoyant sorbent which may be entrained with the water and which would otherwise pass past the boom system.

In the system shown in FIGS. 10 and 11 the sorption means comprises a removably attached elongated cover envelope 42 of rectangular configuration (i.e. a blanket like cover). The walls of the cover envelope are made of a mesh material as described herein which is pervious to both the light and heavy liquid. The cover envelope 42 is filled with a porous medium 43 for sorbing the light liquid. The liquid sorbent 43 in this case may or may not be buoyant, as desired. Thus the air bladder or buoyant foam material contained in the flotation tube 35 may be configured so as to be sufficient for the flotation purposes of the boom system, i.e. to cause the sorption means to float at the surface of the heavier liquid.

For the embodiment shown in FIGS. 10 and 11, the cover envelope 42 is sized so that it can be draped over the flotation tube 35 such that the edge portions 44 and 45 of the cover extend into the heavier liquid 45 below the lower level of the lighter liquid 46 (see FIG. 11), i.e. below the interface between the light and heavy liquid. If desired, for example, the upstream edge portion 44 may be disposed so as to extend at an angle away (i.e. upstream) from the flotation tube 35 so as to present a sloped surface to the lighter liquid. In this latter case, if the wall means of the cover envelope are pervious to both the lighter liquid (e.g. gasoline) and the heavier liquid (i.e. water) then this edge portion may act as a kind of sieve or filter, i.e. allowing the water to pass through while capturing (i.e. sorbing) the lighter liquid.

As shown the cover envelope 42 is held in place on top of the flotation tube 35 by being connected at the edge portions 44 and 45 to the flotation tube 35 by releasable connecting means 47 such as a plurality of eyelet/clip connector combinations spaced apart along the length of the flotation tube on both sides thereof. The eyelet of such a connector may be connected to the flotation tube while the corresponding clip may be connected to the cover. The clip may be of the spring snap-on type, namely a hook provided with a spring biased closure element which is biased to a position which closes off the opening of the hook but which may pushed aside to allow the clip to be attached or detached from the eyelet.

As an alternative for the embodiment of FIGS. 10 and 11, the cover envelope 42 may be attached to the flotation tube 35 such that one of the edge portions 44 and 45 extends deeper into the heavier liquid than the other.

In case of damage or for any other reason whatsoever, a system as shown in FIGS. 10 and 11 allows for the relatively easy replacement of the cover sorption means of a section of a boom assembly without having to dismantle the boom assembly (i.e. disconnect a boom section for the other sections) to get at the cover sorption means of a particular boom section.

Figure 12:
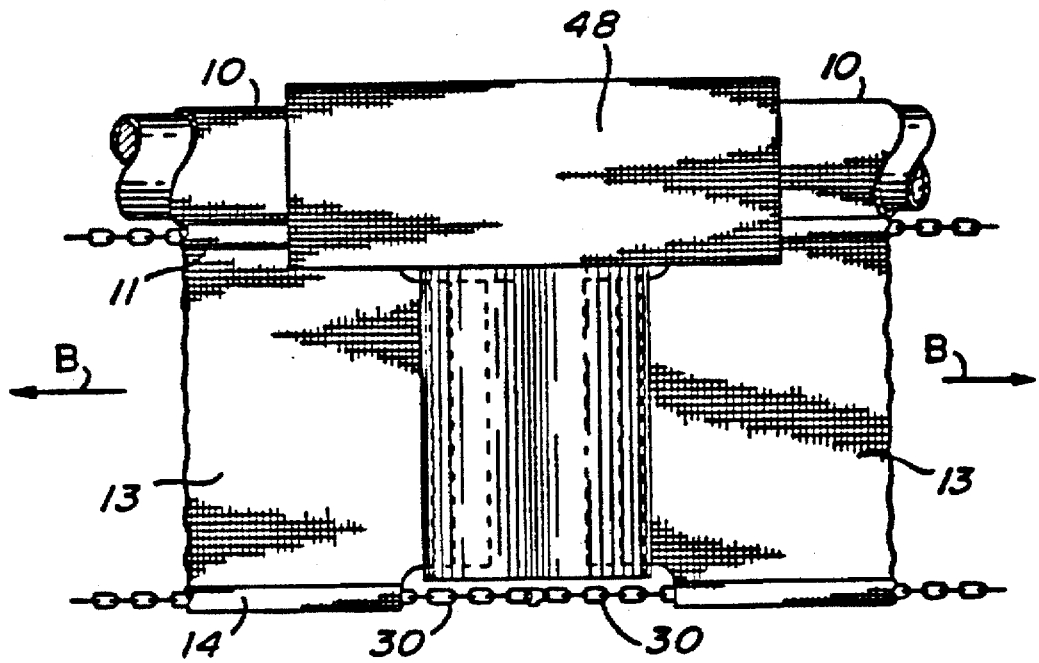
FIG. 12 illustrates a cover sorption means associated with a boom as shown in FIG. 8.

As a third alternate embodiment of a boom system in accordance with the present invention, a cover envelope 42 shown in FIGS. 10 and 11 may be combined with a flotation tube 10 of the boom system as shown in FIGS. 3 and 4. In this case while the cover envelope 42 is being replaced, the flotation tube 10 filled with sorbent will continue to contain the lighter liquid. A cover envelope 42 need not cover all of an underlying flotation tube 10, although it may if so desired. Thus, for example, when a boom assembly comprises a plurality of boom system buoyancy means joined end to end, a cover envelope 41 may be disposed in overlapping relation with respect to the joint between adjacent boom systems so as only cover a portion of the buoyancy means of each boom system on either side of the joint therebetween; see FIG. 12 which is the same as FIG. 8 and thus includes the same reference numerals but which also includes a cover envelope 48 which only overlaps adjacent portions of the two flotation tubes 10 at the joint thereof.

Referring back to FIG. 2, the exterior surface of the flotation tube 1 which is below the liquid lines 50 and 51 is a submerged exterior surface thereof, i.e. it is the exterior surface which is in contact with the light and heavy liquids. The exterior surface of the flotation tube 1 which is above the liquid lines 50 and 51 is a freeboard exterior surface thereof, i.e. it is the exterior surface which is not in contact with the light and heavy liquids.

Referring to back to FIG. 4, the exterior surface of the flotation tube 10 which is below the liquid lines 52 and 53 is a submerged exterior surface thereof, i.e. it is the exterior surface which is in contact with the light and heavy liquids. The exterior surface of the flotation tube 10 which is above the liquid lines 52 and 53 is a freeboard exterior surface thereof, i.e. it is the exterior surface which is not in contact with the light and heavy liquids.

Referring to back to FIG. 11, the exterior surface of the cover envelope 41 which is below the liquid lines 54 and 55 is a submerged exterior surface thereof, i.e. it is the exterior surface which is in contact with the light and heavy liquids. The exterior surface of the cover envelope 41 which is above the liquid lines 54 and 55 is a freeboard exterior surface thereof, i.e. it is the exterior surface which is not in contact with the light and heavy liquids.

Figure 13:
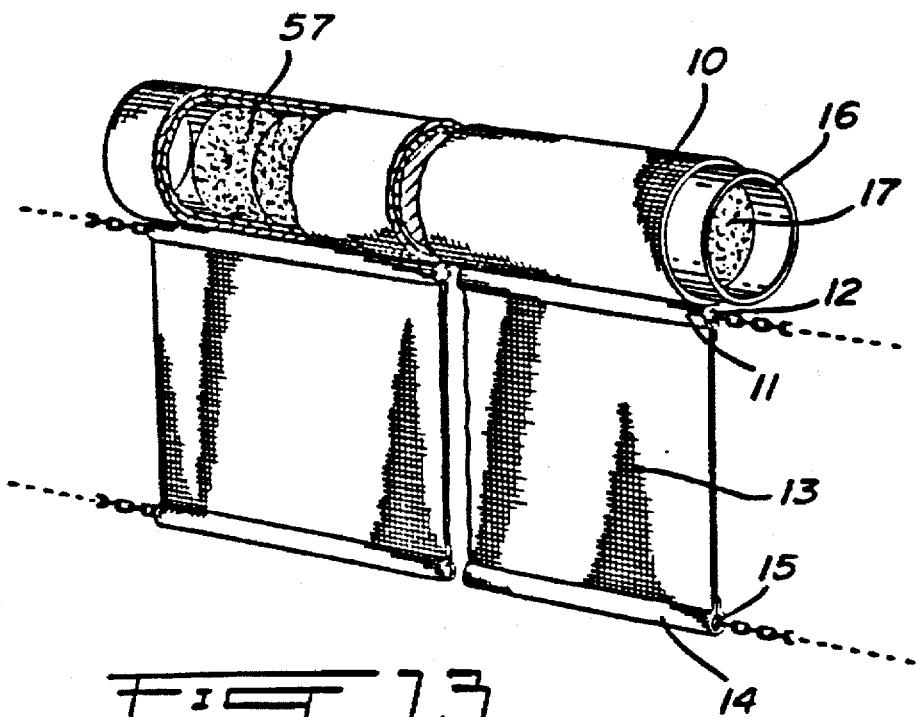
FIG. 13 illustrates a boom system as shown in FIG. 3 but wherein the buoyancy means includes a second buoyancy component.

Referring to FIG. 13, this figure shows a boom system as illustrated in FIG. 3 but which includes a second buoyancy component (so the same reference numerals are used for common features). As may be seen the flotation tube 10 includes held snugly within it one or more flotation plugs 57. The flotation plugs 57 may be cylindrical air bladders or may be cylindrical floats of polystyrene; the diameter of the plugs 57 is of course such as to allow them to be pushed into or out of the tube 10.

Figure 14:
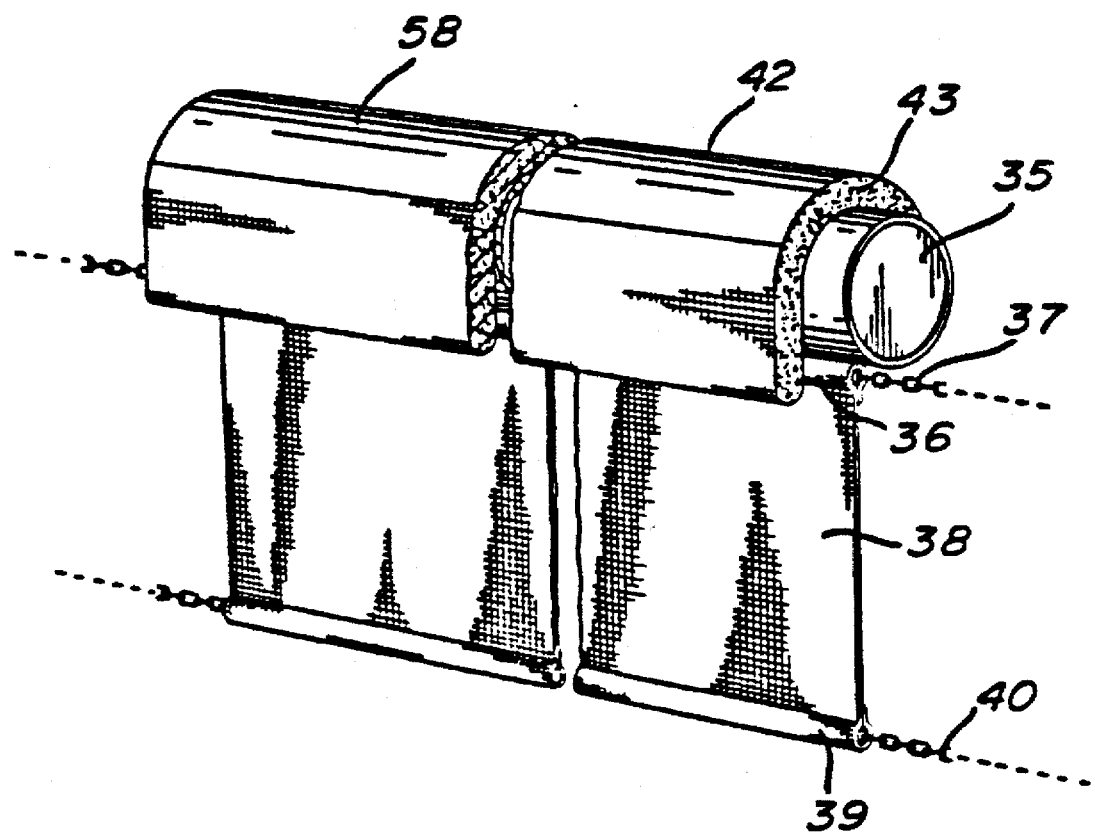
FIG. 14 illustrates a boom system as shown in FIG. 10 but wherein the envelope holding the sorbent has an impervious wall portion.

Referring to FIG. 14, this figure shows a boom system as illustrated in FIG. 10 but wherein the upper part 58 of the wall of the flotation tube 42 is impervious to the liquids (so the same reference numerals are used for common features).

Figure 15:
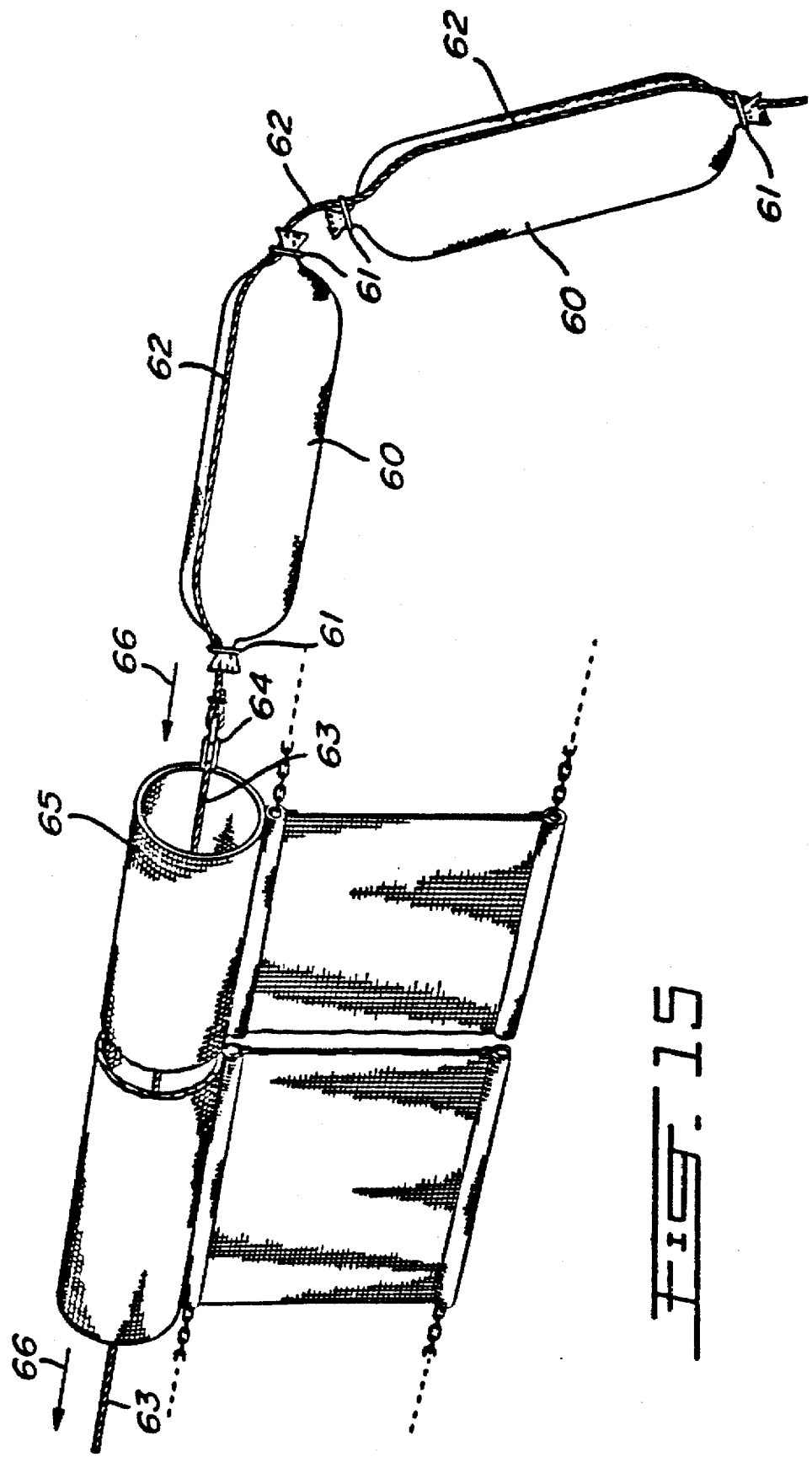
FIG. 15 illustrates a boom system wherein the sorbent is held in an inner tube.

Referring to FIG. 15, this figure illustrates a boom system in accordance with the present invention wherein the sorbent is held in a plurality of "sausage" like inner tubes 60 the wall component of which is made of a suitable pervious mesh material as described herein. The inner tubes are tied off at the ends 61 by a suitable tie cord so as to prevent the sorbent from spilling out of the envelopes. The individual envelopes are linked together by a suitable nylon chord 62. The nylon chord is fixed (e.g. by stitching, by an adhesive, etc.) to the surface of each of the envelopes over the entire longitudinal length of each of the envelopes. The nylon chord 62 is releasably attached to a leader chord 63 by any (known) releasable clip or hooking system 64. The clip system may comprise a hook attached to the chord 63 and an eyelet attached to the chord 62; the hook may include a spring biased member for the closing and opening thereof. The leader chord 63 may also be of nylon. The leader chord 63 is sufficiently long so as to extend through the entire length of the mesh tube 65. Thus by pulling on the leader chord at the opposite end of the tube 65, the "sausages" 60 may be pulled in the direction of the arrow 66 into place within the tube 65. Once in place the leader chord 63 is detached from the chord 62. When it is desired to replace the "sausages" 60 the leader chord 63 is reattached to the chord 60 and the "sausages are pulled out in the direction opposite to the arrow 66; in this fashion the leader chord 63 is pulled through the tube 65 to the other end where it can be attached to a new set of "sausages". The outer diameter of the "sausages" 60 and the inner diameter of the tube 65 must of course be sized such as to allow the "sausages" 60 to be urged into and out of the tube 65. Thus the outer diameter of the "sausages" 60 may be about the same as the inner diameter of the tubes 65 so as to provide a snug tight fit of the "sausages" in the tube 65.

The limitations on the use of the sorbent as hereinabove described include those relating to the nature of the liquid to be sorbed, such as for example:.

a) a viscous liquid will take far more time to soak in than a less viscous one; and b) a liquid which will react with, or otherwise degrade, the sorbent (e.g made of a polyurethane polymer) should be avoided.

A liquid sorbent as described herein may, for example, have a pick-up ratio (sorbent:oil) of for example 1:10 to 1:18 by weight.

The separation of sorbed liquid from the (solid) sorbent may be carried out mechanically by simple pressing. Alternatively, it may advantageously be separated in simple fashion using any (commercial or known) centrifuge capable of separating sorbed liquid from the sorbent such that sorbed liquid is isolated from the sorbent and separately recoverable.

The centrifuge used must be of a type which can support the solid sorbent during treatment and isolate any liquid leaving the sorbent so as to avoid further contact with the sorbent and reabsorption thereby. The centrifuge may for example have a rotatable drum or bowl having fine holes which are smaller than the particles of sorbent such that as the bowl rotates the sorbent is retained in the bowl while the liquid passes through the holes for collection or recovery. A known centrifuge of this type may be used such as for example the Mercone C-series centrifuges by Dorr Oliver Milford, Conn., U.S.A..

The conditions required in the centrifuge can be readily determined in accordance with type of light liquid, the type of sorbent, the size and form of the sorbent, etc. . . . For a liquid, such as gasoline, a centrifuge capable of 20 g (or higher) may be adequate. For more viscous liquids, such as crude oil, higher g figures may be required along with a longer centrifuge residence time; the separation may be encouraged by the application of heat to lower the viscosity of the liquid or by the addition of a diluent (e.g. trichloroethylene, gasoline, naphtha, and the like) to the sorbent\liquid combination prior to or during centrifugation for the same purpose. Again, for a viscous liquid, the presence of a viscosity-reducing diluent has a direct influence on the centrifuge conditions required.

The recovered liquid may if necessary or desired be subjected to further processing; the solid sorbent, depending on its type, etc., may also be recycled for re-use. If desired the centrifuge may be configured to treat a bladder or cover envelope directly without having to empty out the sorbent first; in this case the bladder or cover envelope is centrifuged and thereafter sent back for re-use. Turning back to FIGS. 3 and 7, the flotation tube 10 may additionally be provided with an upstanding (sail-like) web on the top side thereof so as to give the flotation containment means additional blocking capacity with respect to the freeboard portion of the boom system; similarly for the cover wall component of the system shown in FIG. 10.

Figure 16:
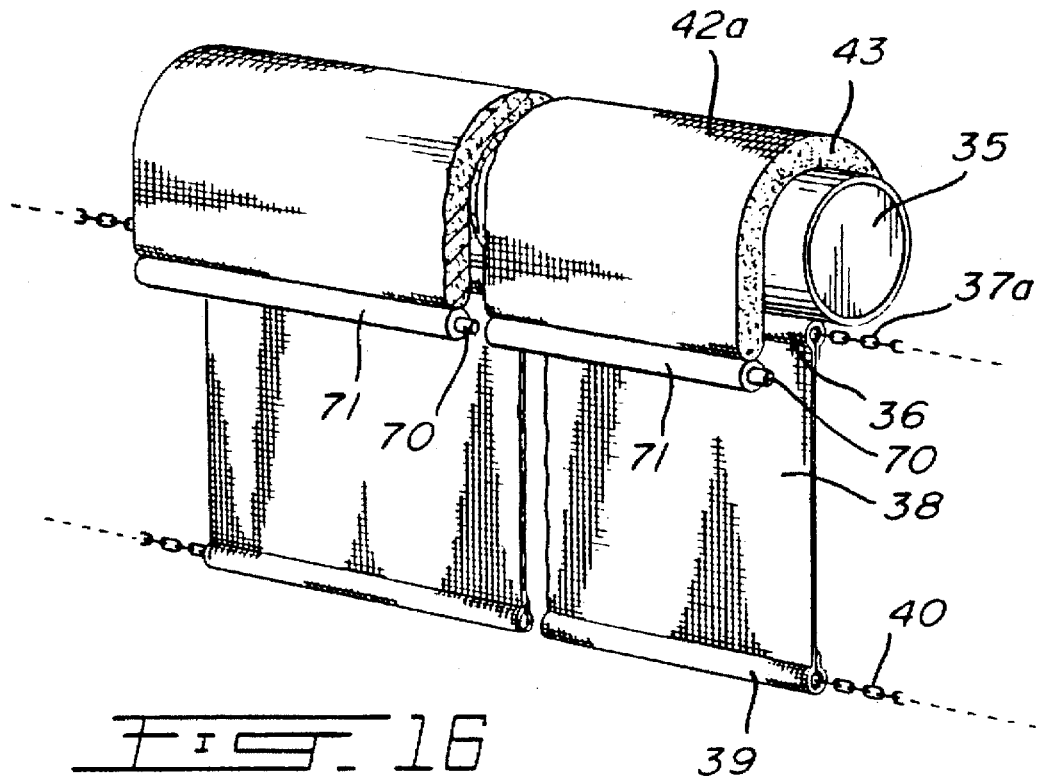
Figure 17:
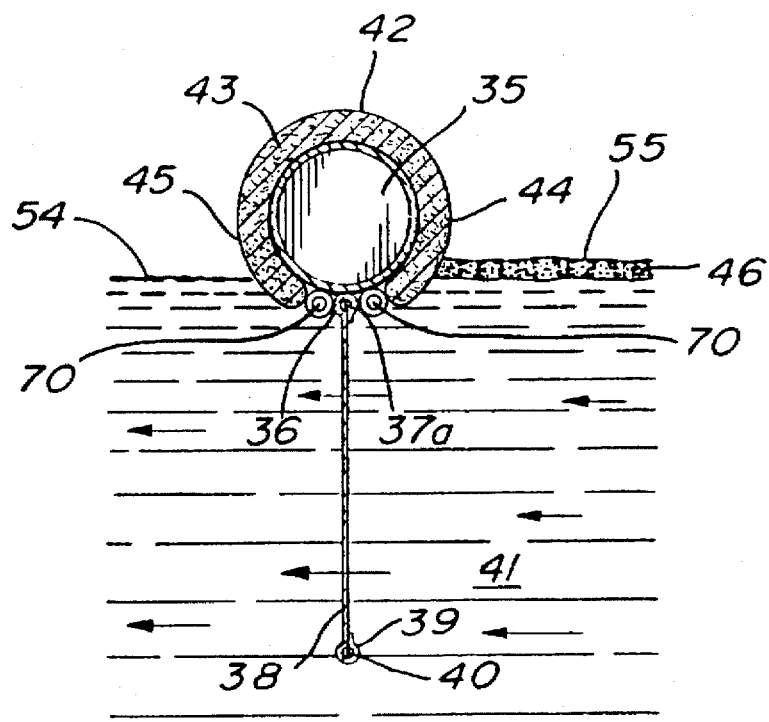
FIG. 17 illustrates a cross section of the boom of FIG. 16.

FIGS. 10 and 11 illustrate, as mentioned above, a boom system comprising an elongated cover envelope which is releasable attached to the flotation tube by releasable eyelet/ clip connectors. FIGS. 16 and 17 illustrate an example embodiment of a boom system as seen in FIGS. 10 and 11 but wherein the releasable connection means comprises bar magnets 70 disposed in sleeve elements 71; the same reference numerals are used to designate the other elements which are common with the system of FIGS. 10 and 11. For the embodiment seen in FIGS. 16 and 17, the chain 37a is a ferrous metal chain which can magnetically attract the magnet elements 70. FIG. 17 shows the magnet elements 70 adjacent the ferrous chain 37a. The magnet elements 70 have sufficient magnetic force that their attraction to the chain 37a is sufficient to hold the envelope 42a in place. The magnets are of course chosen on the basis of the degree to which they can be attracted to the chain 37a under conditions of use of the boom system. FIG. 16 shows one of the magnet elements 70 spaced away from the chain 37a preparatory to either attaching the cover envelope in place or for removing it altogether. If desired another type of releasable connection means could be used in place of the magnet/ sleeve combinations, e.g. a hook and mat type system such as that known under the name Velcro.

Figure 18:
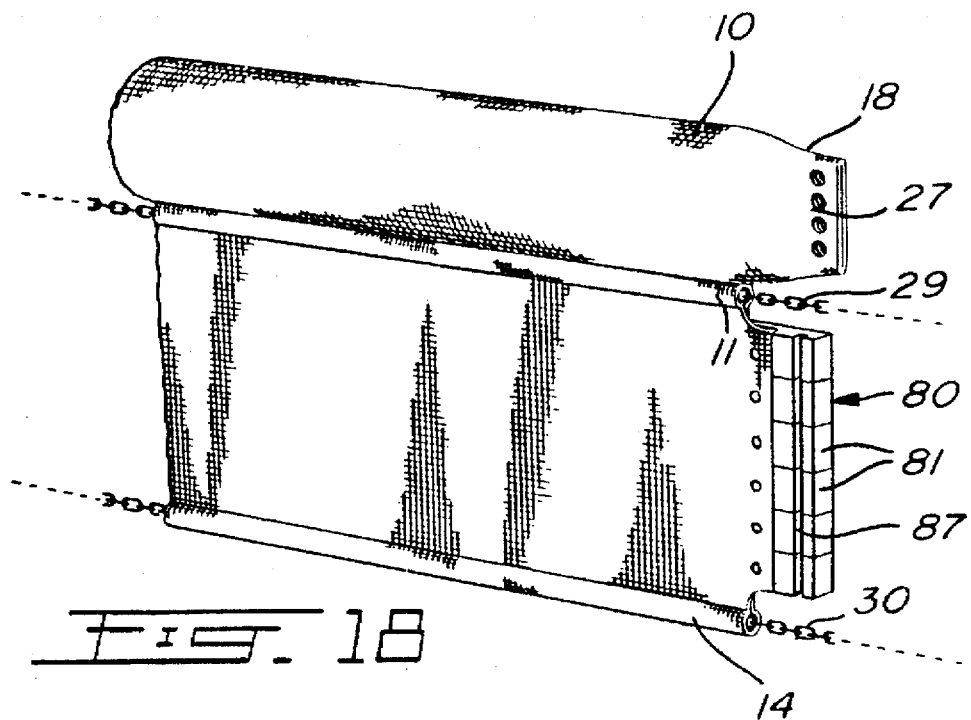
FIG. 18 illustrates an alternate embodiment of the end of the boom system of FIG. 3 wherein the lower attachment is flexible.

FIG. 8 as described above, illustrates a relatively inflexible connection between adjacent skirts. FIGS. 18 to 23 illustrate a means for a flexible linkage between adjacent skirts. FIG. 18 shows a flexible linkage member 80; the linkage member 80 comprises a plurality of individual bayonet type linkage elements, two of which are designated with the reference numeral 81. The linkage elements 81 are pivotally connected to each other such that the linkage member 80 can bend from top to bottom under the influence of a water current such that the skirt and linkage member 80 may have a bowed profile as seen schematically, for example, in FIG. 19.

An example linkage element 81 is illustrated in FIGS. 20 to 23. FIG. 22 is a top view of the linkage element 81 seen in the direction of the arrow 82; FIG. 23 is a bottom view of the linkage element 81 seen in the direction of the arrow 83. The linkage element 81 has a male element 84 and a female element 85. The linkage element 81 also has a hooking member 86 and an inclined groove 87 having a configuration corresponding to that of the hooking member 86. The hooking member 86 further has an inclined exterior face 88.

Figure 19:
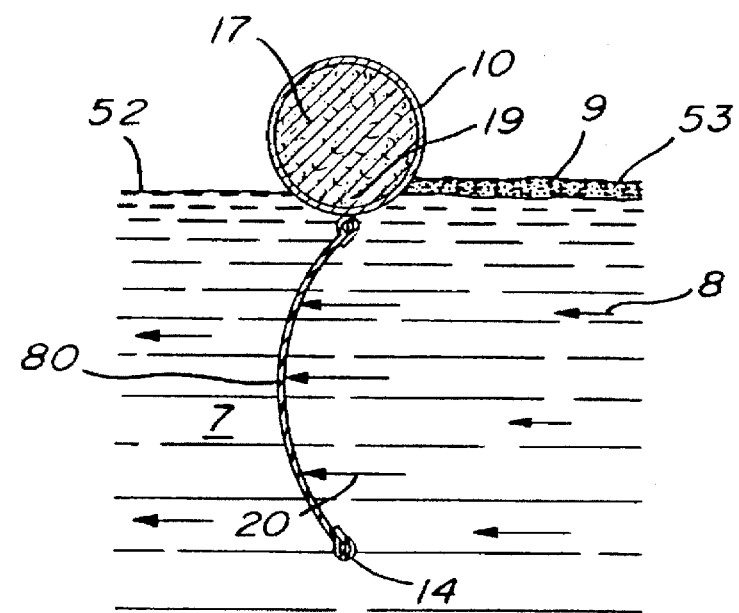
FIG. 19 illustrates a cross section of the boom system of FIG. 19 in place in a moving current of water.

As may be appreciated, a linkage member 80 as seen in FIG. 18 may be made up of a plurality of linkage elements 81. One linkage element 81 may be linked to an adjacent linkage element by sliding the male element 84 of one linkage element into the opening of the female element 85 of an adjacent linkage element 81. The engagement between the male and female elements 84 and 85 is configured so as not to be snug but is a relatively loose fit so as to allow the linkage member 80 to longitudinally bend or bow about the horizontal axis of the boom as shown in FIG. 19; the fit is nevertheless still sufficiently rigid so as to hinder or prevent the collapse of the skirt. The bowed configuration may have an arc like configuration, a parabolic like configuration, a hyperbolic like configuration, etc, depending on the degree to which a linkage element may pivot about the male element of an adjacent linkage element. Once the required number of linkage elements 81 are connected together these elements may be attached to the skirt by means of suitable nut and bolt connection means passing through the openings 89. The linkage member of an adjacent skirt may be made up of the same linkage elements but which are reversed relative to the linkage member 80 such that the hooking members of linkage member 80 may engage the inclined openings 87 of the other linkage member; once so engaged the two linkage members may be fastened (e.g. bolted) together in any suitable fashion keeping in mind that the linkage between adjacent skirts must allow for the above mentioned bowed profile in the presence of a water current. The linkage members are flexible so as to not only take a profile as shown in FIG. 19 but if there should be a change in direction of the water current (as with tides) the skirt is able to take a reverse profile. The use of such a vertically bendable linkage mechanism provides a boom assembly which is relatively stable in the presence of a high water current. If desired however, the linkage mechanism may be one which permanently provides a profile as seen in FIG. 19, i.e. by using a pair of integral bowed members having a cross-section of a linkage element as seen in FIGS. 20 to 23. As may be appreciated the bowed skirt when subjected to a water current has a ballooned configuration giving it stability characteristics believed to be similar to that of a rectangular parachute.

I claim:

1. In a boom system for containing a lighter liquid disposed on top of a heavier liquid, said system comprising
flotation containment means for containing lighter liquid disposed on top of heavier liquid,
skirt means,
ballast means,
and reinforcing means,
said flotation containment means comprising buoyancy means for the flotation of the boom system,
said flotation containment means, when the boom system is in use, being able to define an exterior surface comprising a freeboard exterior surface and a submerged exterior surface,
said flotation containment means comprising sorption means for sorbing lighter liquid, said buoyancy means being able to buoy said sorption means,
said sorption means comprising a porous medium for sorbing the lighter liquid and a wall component configured to contain said porous medium,
at least part of said wall component comprising a mesh material pervious to both the lighter and the heavier liquid such that lighter liquid may pass through the mesh material of the wall component for contacting said porous medium,
said skirt means having an upper edge and a lower edge, said upper edge being attached to the flotation containment means such that when the boom system is in use the skirt means depends from the flotation containment means, said ballast means beings disposed along said lower edge of said skirt means, the improvement wherein said skirt means is pervious at least to the heavier liquid and comprises an open mesh wall having mesh openings for the passage of the heavier liquid through the skirt means, said open mesh wall extending from said upper edge to said lower edge, wherein the reinforcing means is disposed along said upper edge of the skirt means, wherein 35 to 60 percent of the mesh wall of the skirt means comprises said mesh openings, wherein said mesh openings are from about 5 mm$^2$ to about 15 mm$^2$, and wherein the mesh wall of said skirt means comprises an oleophilic mesh material.

2. A boom system as defined in claim 1 wherein said mesh material of said wall component of said sorption means defines at least part of said submerged exterior surface.

3. A boom system as defined in claim 2 wherein said mesh material of said wall component of said sorption means defines at least part of said freeboard exterior surface.

4. A boom system as defined in claim 3 wherein said wall component of said sorption means consists of a mesh material pervious to both the lighter and the heavier liquid.

5. In a boom system for containing a lighter liquid disposed on top of a heavier liquid said system comprising flotation containment means for containing the lighter liquid disposed on top of the heavier liquid, skirt means, ballast means, and reinforcing means, said flotation containment means comprising buoyancy means for the flotation of the boom system, said buoyancy means, when the boom system is in use, having an exterior surface comprising a freeboard exterior surface and a submerged exterior surface, said buoyancy means comprising a buoyancy component comprising a porous medium for sorbing the lighter liquid and for providing buoyancy for the flotation of the boom system and a wall component for containing said porous medium, at least part of said wall component comprising a mesh material pervious to both the lighter and the heavier liquid such that lighter liquid may pass through the wall component for contacting said porous medium, said skirt means having an upper edge and a lower edge, said upper edge being attached to the flotation containment means such that when the boom system is in use the skirt means depends from the flotation containment means, said ballast means beings disposed along said lower edge of said skirt means, the improvement wherein said skirt means is pervious at least to the heavier liquid and comprises an open mesh wall having mesh openings for the passage of the heavier liquid through the skirt means, said open mesh wall extending from said upper edge to said lower edge, wherein the reinforcing means is disposed along said upper edge of the skirt means, wherein 35 to 60 percent of the mesh wall of the skirt means comprises said mesh openings, wherein said mesh openings are from about 5 mm$^2$ to about 15 mm$^2$, and wherein the mesh wall of said skirt means comprises an oleophilic mesh material.

6. A boom system as defined in claim 5 wherein said mesh material of said wall component of said buoyancy component defines at least part of said submerged exterior surface.

7. A boom system as defined in claim 6 wherein said mesh material of said wall component of said buoyancy component defines at least part of said freeboard exterior surface.

8. A boom system as defined in claim 7 wherein said buoyancy means consists of said buoyancy component and wherein said wall component thereof consists of a mesh material pervious to both the lighter and the heavier liquid.

9. A boom system as defined in claim 5 wherein the reinforcing means comprises a member selected from the group comprising a chain and a wire rope.

10. A boom system as defined in claim 5 wherein the reinforcing means comprises a chain, said chain being disposed in a chain pocket.

11. A boom system as defined in claim 10 wherein the ballast means comprises a chain.

12. A boom system as defined in claim 11 wherein said chain is disposed in a chain pocket.

13. A boom system as defined in claim 8 wherein said porous medium is contained within an inner tube, said inner tube being removably disposed within said wall component of said buoyancy component, the inner tube comprising a wall component consisting of a mesh material pervious to both the lighter and the heavier liquid.

14. A boom system as defined in claim 13 wherein the mesh material of the wall component of said buoyancy component is different from the mesh material of the wall component of the inner tube.

15. A boom system as defined in claim 13 wherein the mesh material of the wall component of said buoyancy component is the same as the mesh material of the wall component of the inner tube.

16. A boom system as defined in claim 8 wherein the mesh wall of said skirt means comprises a mesh material the same as the mesh material of the wall component of the buoyancy component.

17. A boom system as defined in claim 16 wherein the mesh material of the wall component of the buoyancy component comprises a material selected from the group comprising a woven fabric and a nonwoven fabric.

18. A boom system as defined in claim 16 wherein the mesh material of the wall component of the buoyancy component comprises a fabric woven from thermoplastic monofilaments so as to define a weave pattern wherein the monofilaments cross each other at a plurality of crossover points, and which has been heatset to weld the monofilaments to each other at substantially all the crossover points in the weave pattern.

19. A boom system as defined in claim 18 wherein the fabric weave pattern provides substantially square holes in the fabric.

20. A boom system as defined in claim 18 wherein the fabric weave pattern provides substantially rectangular holes in the fabric.

21. A boom system as defined in claim 19 wherein the thermoplastic monofilaments comprise a core of polyester coated with polyvinylchloride.

22. In a boom system for containing a lighter liquid disposed on top of a heavier liquid, said system comprising flotation containment means for containing lighter liquid disposed on top of heavier liquid, skirt means, ballast means, and reinforcing means, said flotation containment means comprising buoyancy means for the flotation of the boom system, said flotation containment means, when the boom system is in use, being able to define an exterior surface comprising a freeboard exterior surface and a submerged exterior surface, said skirt means having an upper edge and a lower edge, said upper edge being attached to the flotation containment means such that when the boom system is in use the skirt means depends from the flotation containment means, said ballast means being disposed along said lower edge of said skirt means, the improvement wherein the flotation containment means comprises detachable cover sorption means for sorbing lighter liquid, said detachable cover sorption means covering at least a part of an exterior surface of said buoyancy means, said detachable cover sorption means being releasably attached to said buoyancy means by releasable attachment means such that when the boom system is in use the detachable cover sorption means is able to define at least part of said freeboard exterior surface and at least part of said submerged exterior surface, wherein said detachable cover sorption means comprises a porous medium for sorbing the lighter liquid and a wall component for containing said porous medium, wherein at least part of said wall component comprises a mesh material pervious to both the lighter and the heavier liquid such that lighter liquid may pass through the mesh material of the wall component for contacting said porous medium, wherein said skirt means is pervious at least to the heavier liquid and comprises an open mesh wall having mesh openings for the passage of the heavier liquid through the skirt means, and wherein the reinforcing means is disposed along said upper edge of the skirt means.

23. A boom system as defined in claim 22 wherein 35 to 60 percent of the mesh wall of said skirt means comprises said mesh openings.

24. A boom system as defined in claim 23 wherein said mesh openings are from about 5 mm$^2$ to about 15 mm$^2$.

25. A boom system as defined in claim 22 wherein said mesh material of said wall component of said detachable cover sorption means defines at least part of said freeboard exterior surface.

26. A boom system as defined in claim 25 wherein said mesh material of said wall component of said detachable cover sorption means defines at least part of said freeboard exterior surface.

27. A boom system as defined in claim 26 wherein said wall component of the detachable cover sorption means consists of a mesh material pervious to both the lighter and the heavier liquid.

28. A boom system as defined in claim 22 wherein said detachable cover sorption means is releasably attached to said buoyancy means such that when the boom system is in use the detachable cover sorption means is draped over said buoyancy means.

29. In a boom system for containing a lighter liquid disposed on top of a heavier liquid, said system comprising flotation containment means for containing lighter liquid disposed on top of heavier liquid, skirt means, ballast means, and reinforcing means, said flotation containment means comprising buoyancy means for the flotation of the boom system, said flotation containment means, when the boom system is in use, being able to define an exterior surface comprising a freeboard exterior surface and a submerged exterior surface, said skirt means having an upper edge and a lower edge, said upper edge being attached to the flotation containment means such that when the boom system is in use the skirt means depends from the flotation containment means, said ballast means being disposed along said lower edge of said skirt means, the improvement wherein the flotation containment means comprises detachable cover sorption means for sorbing lighter liquid, said detachable cover sorption means covering at least a part of an exterior surface of said buoyancy means, said detachable cover sorption means being releasably attached to said buoyancy means by releasable attachment means such that when the boom system is in use the detachable cover sorption means is able to define at least part of said freeboard exterior surface and at least part of said submerged exterior surface, wherein said detachable cover sorption means comprises a first porous medium for sorbing lighter liquid and a cover wall component for containing said first porous medium, wherein at least part of said cover wall component comprises a mesh material pervious to both the lighter and the heavier liquid such that lighter liquid may pass through the mesh material of the wall component for contacting said first porous medium, wherein said buoyancy means comprises a buoyancy component, said buoyancy component comprising a second porous medium for sorbing said lighter liquid and for providing buoyancy for the flotation of the boom system and a second wall component configured to contain said second porous medium, wherein at least part of said second wall component comprises a mesh material pervious to both the lighter and the heavier liquid such that lighter liquid may pass through the mesh material of the second wall component for contacting said second porous medium, wherein said skirt means is pervious at least to the heavier liquid and comprises a open mesh wall having mesh openings for the passage of the heavier liquid through the mesh wall, and wherein the reinforcing means is disposed along said upper edge of the skirt means.

30. A boom system as defined in claim 29 wherein 35 to 60 percent of the mesh wall of said skirt means comprises said mesh openings.

31. A boom system as defined in claim 30 wherein said mesh openings are from about 5 mm$^2$ to about 15 mm$^2$.

32. A boom system as defined in claim 29 wherein said mesh material of said cover wall component defines at least part of said submerged exterior surface.

33. A boom system as defined in claim 32 wherein said mesh material of said cover wall component defines at least part of said freeboard exterior surface.

34. A boom system as defined in claim 33 wherein the cover wall component of said detachable cover sorption means and the second wall component of the buoyancy component each consists of a mesh material pervious to both the lighter and the heavier liquid.

35. A boom system as defined in claim 33 wherein said buoyancy means consists of said buoyancy component.

36. A boom system as defined in claim 33 wherein said first porous medium is of a buoyant material.

37. A boom system as defined in 36 wherein said first and second porous media are the same.

38. A boom system as defined in claim 29 wherein said detachable cover sorption means is releasably attached to said buoyancy means such that when the boom system is in use the detachable cover sorption means is draped over said buoyancy means.

39. A boom system as defined in claim 22 wherein the mesh wall of said skirt means comprises an oleophilic mesh material.

40. A boom system as defined in claim 29 wherein the mesh wall of said skirt means comprises an oleophilic mesh material.

41. A boom system as defined in claim 29 wherein the detachable cover sorption means and the buoyancy component are configure such that, when the boom system is in use, any part of said buoyancy component not covered by said detachable cover sorption means is able to define an exposed exterior surface such that said exterior surface of the flotation containment means comprises said exposed exterior surface of said buoyancy component.

* * * * *